(12) United States Patent
Winograd et al.

(10) Patent No.: US 10,504,200 B2
(45) Date of Patent: *Dec. 10, 2019

(54) METADATA ACQUISITION USING EMBEDDED WATERMARKS

(71) Applicant: Verance Corporation, San Diego, CA (US)

(72) Inventors: Joseph M. Winograd, San Diego, CA (US); Jian Zhao, San Diego, CA (US); Rade Petrovic, San Diego, CA (US)

(73) Assignee: Verance Corporation, San Diego, CA (US)

(*) Notice: Subject to any disclaimer, the term of this patent is extended or adjusted under 35 U.S.C. 154(b) by 641 days.

This patent is subject to a terminal disclaimer.

(21) Appl. No.: 14/805,303

(22) Filed: Jul. 21, 2015

(65) Prior Publication Data

US 2015/0324947 A1 Nov. 12, 2015

Related U.S. Application Data

(63) Continuation-in-part of application No. 14/703,434, filed on May 4, 2015, which is a continuation-in-part
(Continued)

(51) Int. Cl.
*G06F 15/16* (2006.01)
*G06T 1/00* (2006.01)
(Continued)

(52) U.S. Cl.
CPC ............ *G06T 1/0021* (2013.01); *G06F 16/48* (2019.01); *G06F 16/9566* (2019.01);
(Continued)

(58) Field of Classification Search
CPC .................... G06T 1/0021; H04L 67/2804
See application file for complete search history.

(56) References Cited

U.S. PATENT DOCUMENTS 5,995,153 A 11/1999 Moeller et al.
6,122,610 A 9/2000 Isabelle
(Continued)

FOREIGN PATENT DOCUMENTS

CN 102474658 5/2012
CN 103299648 9/2013
(Continued)

OTHER PUBLICATIONS

International Search Report and Written Opinion dated Jan. 21, 2016 for International Application No. PCT/US2015/046166, filed Aug. 20, 2015 (8 pages).
(Continued)

*Primary Examiner* — Hua Fan
(74) *Attorney, Agent, or Firm* — Perkins Coie LLP; Donald L. Wenskay

(57) ABSTRACT

Methods, devices and computer program products are described that improve acquisition of metadata that is associates with a multimedia content, such an audio or video content. In one exemplary method, the multimedia content is received at a first device that is equipped with a watermark detector and watermark extraction operations are conducted to detect a plurality of watermark messages. Each watermark message includes a server code and an interval code. In this method, a server Internet Protocol (IP) address is obtained that corresponds to a server that stores at least a portion of the metadata associated with the multimedia content. The IP address corresponds to at least one of the server codes detected from the plurality of watermark messages. According to the above method, the metadata is requested from the server having the server IP address, and a response including the metadata associated with the multimedia content is received.

10 Claims, 21 Drawing Sheets

Related U.S. Application Data of application No. 14/656,578, filed on Mar. 12, 2015, now Pat. No. 9,596,521.

(60) Provisional application No. 61/952,840, filed on Mar. 13, 2014, provisional application No. 61/953,668, filed on Mar. 14, 2014, provisional application No. 61/988,094, filed on May 2, 2014, provisional application No. 62/005,836, filed on May 30, 2014, provisional application No. 62/027,163, filed on Jul. 21, 2014.

(51) Int. Cl.
| | |
|---|---|
| *H04N 21/234* | (2011.01) |
| *H04N 21/61* | (2011.01) |
| *H04L 29/12* | (2006.01) |
| *H04L 29/08* | (2006.01) |
| *H04L 29/06* | (2006.01) |
| *G06F 16/48* | (2019.01) |
| *G06F 16/955* | (2019.01) |

(52) U.S. Cl.
CPC ........ *H04L 61/305* (2013.01); *H04L 65/4076* (2013.01); *H04L 65/4084* (2013.01); *H04L 65/80* (2013.01); *H04L 67/2804* (2013.01); *H04L 67/2857* (2013.01); *H04N 21/23418* (2013.01); *H04N 21/6125* (2013.01); *H04L 61/1511* (2013.01); *H04L 61/302* (2013.01); *H04L 67/02* (2013.01); *H04L 67/20* (2013.01)

(56) References Cited

U.S. PATENT DOCUMENTS

| | | | |
|---|---|---|---|
| 6,145,081 | A | 11/2000 | Winograd et al. |
| 6,175,627 | B1 | 1/2001 | Petrovic et al. |
| 6,314,192 | B1 | 11/2001 | Chen et al. |
| 6,411,725 | B1 | 6/2002 | Rhoads et al. |
| 6,427,012 | B1 | 7/2002 | Petrovic |
| 6,430,301 | B1 | 8/2002 | Petrovic |
| 6,490,579 | B1 | 12/2002 | Gao et al. |
| 6,556,688 | B1 | 4/2003 | Ratnakar |
| 6,577,747 | B1 | 6/2003 | Kalker et al. |
| 6,683,958 | B2 | 1/2004 | Petrovic |
| 6,721,439 | B1 | 4/2004 | Levy et al. |
| 6,757,405 | B1 | 6/2004 | Muratani et al. |
| 6,792,542 | B1 | 9/2004 | Lee et al. |
| 6,839,673 | B1 | 1/2005 | Choi et al. |
| 6,888,943 | B1 | 5/2005 | Lam et al. |
| 6,895,430 | B1 | 5/2005 | Schneider |
| 6,931,536 | B2 | 8/2005 | Hollar |
| 7,024,018 | B2 | 4/2006 | Petrovic |
| 7,092,774 | B1 | 8/2006 | Gifford et al. |
| 7,140,043 | B2 | 11/2006 | Choi et al. |
| 7,159,118 | B2 | 1/2007 | Petrovic |
| 7,224,819 | B2 | 5/2007 | Levy et al. |
| 7,343,397 | B2 | 3/2008 | Kochanski |
| 7,460,667 | B2 | 12/2008 | Lee et al. |
| 7,533,266 | B2 | 5/2009 | Bruekers et al. |
| 7,548,565 | B2 | 6/2009 | Sull et al. |
| 7,707,422 | B2 | 4/2010 | Shin et al. |
| 7,774,834 | B1 | 8/2010 | Chauhan et al. |
| 7,779,271 | B2 | 8/2010 | Langelaar |
| 7,983,922 | B2 | 7/2011 | Neusinger et al. |
| 7,986,806 | B2 | 7/2011 | Rhoads |
| 7,991,995 | B2 | 8/2011 | Rabin et al. |
| 8,005,258 | B2 | 8/2011 | Petrovic et al. |
| 8,015,410 | B2 | 9/2011 | Pelly et al. |
| 8,055,013 | B2 | 11/2011 | Levy et al. |
| 8,059,815 | B2 | 11/2011 | Lofgren et al. |
| 8,059,858 | B2 | 11/2011 | Brundage et al. |
| 8,081,757 | B2 | 12/2011 | Voessing et al. |
| 8,085,935 | B2 | 12/2011 | Petrovic |
| 8,103,049 | B2 | 1/2012 | Petrovic et al. |
| 8,138,930 | B1 | 3/2012 | Heath |
| 8,151,113 | B2 | 4/2012 | Rhoads |
| 8,181,262 | B2 | 5/2012 | Cooper et al. |
| 8,189,861 | B1 | 5/2012 | Rucklidge |
| 8,194,803 | B2 | 6/2012 | Baum et al. |
| 8,249,992 | B2 | 8/2012 | Harkness et al. |
| 8,259,873 | B2 | 9/2012 | Baum et al. |
| 8,280,103 | B2 | 10/2012 | Petrovic et al. |
| 8,301,893 | B2 | 10/2012 | Brundage |
| 8,315,835 | B2 | 11/2012 | Tian et al. |
| 8,321,679 | B2 | 11/2012 | Petrovic et al. |
| 8,340,348 | B2 | 12/2012 | Petrovic et al. |
| 8,346,532 | B2 | 1/2013 | Chakra et al. |
| 8,346,567 | B2 | 1/2013 | Petrovic et al. |
| 8,434,123 | B2 | 4/2013 | Liwerant et al. |
| 8,467,717 | B2 | 6/2013 | Croy et al. |
| 8,479,225 | B2 | 7/2013 | Covell et al. |
| 8,483,136 | B2 | 7/2013 | Yuk et al. |
| 8,533,481 | B2 | 9/2013 | Petrovic et al. |
| 8,538,066 | B2 | 9/2013 | Petrovic et al. |
| 8,560,604 | B2 | 10/2013 | Shribman et al. |
| 8,588,459 | B2 | 11/2013 | Bloom et al. |
| 8,589,969 | B2 | 11/2013 | Falcon |
| 8,601,504 | B2 | 12/2013 | Stone et al. |
| 8,615,104 | B2 | 12/2013 | Petrovic et al. |
| 8,666,528 | B2 | 3/2014 | Harkness et al. |
| 8,682,026 | B2 | 3/2014 | Petrovic et al. |
| 8,713,618 | B1 | 4/2014 | Kuznetsov |
| 8,726,304 | B2 | 5/2014 | Petrovic et al. |
| 8,745,403 | B2 | 6/2014 | Petrovic |
| 8,768,714 | B1 | 7/2014 | Blesser |
| 8,781,967 | B2 | 7/2014 | Tehranchi et al. |
| 8,791,789 | B2 | 7/2014 | Petrovic et al. |
| 8,806,517 | B2 | 8/2014 | Petrovic et al. |
| 8,811,655 | B2 | 8/2014 | Petrovic et al. |
| 8,825,518 | B2 | 9/2014 | Levy |
| 8,838,977 | B2 | 9/2014 | Winograd et al. |
| 8,838,978 | B2 | 9/2014 | Winograd et al. |
| 8,869,222 | B2 | 10/2014 | Winograd et al. |
| 8,898,720 | B2 | 11/2014 | Eyer |
| 8,923,548 | B2 | 12/2014 | Petrovic et al. |
| 8,959,202 | B2 | 2/2015 | Haitsma et al. |
| 8,990,663 | B2 | 3/2015 | Liu et al. |
| 9,009,482 | B2 | 4/2015 | Winograd |
| 9,042,598 | B2 | 5/2015 | Ramaswamy et al. |
| 9,055,239 | B2 | 6/2015 | Tehranchi et al. |
| 9,106,964 | B2 | 8/2015 | Zhao |
| 9,117,270 | B2 | 8/2015 | Wong et al. |
| 9,147,402 | B2 | 9/2015 | Chen et al. |
| 9,277,183 | B2 | 3/2016 | Eyer |
| 9,596,521 | B2 | 3/2017 | Winograd et al. |
| 9,602,891 | B2 | 3/2017 | Winograd et al. |
| 9,607,131 | B2 | 3/2017 | Winograd et al. |
| 9,639,911 | B2 | 5/2017 | Petrovic et al. |
| 9,769,543 | B2 | 9/2017 | Petrovic et al. |
| 9,805,434 | B2 | 10/2017 | Petrovic et al. |
| 9,942,602 | B2 | 4/2018 | Petrovic et al. |
| 2001/0044899 | A1 | 11/2001 | Levy |
| 2002/0032864 | A1 | 3/2002 | Rhoads et al. |
| 2002/0059622 | A1 | 5/2002 | Grove et al. |
| 2002/0078233 | A1 | 6/2002 | Biliris et al. |
| 2002/0094082 | A1 | 7/2002 | Jones et al. |
| 2002/0138695 | A1 | 9/2002 | Beardsley et al. |
| 2002/0168087 | A1 | 11/2002 | Petrovic |
| 2003/0012403 | A1 | 1/2003 | Rhoads et al. |
| 2003/0055979 | A1 | 3/2003 | Cooley |
| 2003/0065739 | A1 | 4/2003 | Shnier |
| 2003/0084294 | A1 | 5/2003 | Aoshima et al. |
| 2003/0103645 | A1* | 6/2003 | Levy ................. G06F 17/30876 382/100 |
| 2003/0193616 | A1 | 10/2003 | Baker et al. |
| 2003/0228030 | A1 | 12/2003 | Wendt |
| 2004/0039914 | A1 | 2/2004 | Barr et al. |
| 2004/0101160 | A1 | 5/2004 | Kunisa |
| 2004/0202324 | A1 | 10/2004 | Yamaguchi et al. |
| 2004/0250080 | A1 | 12/2004 | Levy et al. |
| 2005/0071423 | A1 | 3/2005 | Rajaniemi |
| 2005/0123169 | A1 | 6/2005 | Wendt |
| 2005/0182792 | A1 | 8/2005 | Israel et al. |

(56) References Cited

U.S. PATENT DOCUMENTS

| | | |
|---|---|---|
| 2006/0047704 A1 | 3/2006 | Gopalakrishnan |
| 2006/0053292 A1 | 3/2006 | Langelaar |
| 2006/0083242 A1 | 4/2006 | Pulkkinen |
| 2006/0115108 A1 | 6/2006 | Rodriguez et al. |
| 2006/0239501 A1 | 10/2006 | Petrovic et al. |
| 2006/0239503 A1 | 10/2006 | Petrovic et al. |
| 2007/0003103 A1 | 1/2007 | Lemma et al. |
| 2007/0039018 A1 | 2/2007 | Saslow et al. |
| 2007/0071037 A1 | 3/2007 | Abraham et al. |
| 2007/0135084 A1 | 6/2007 | Ido et al. |
| 2007/0208744 A1 | 9/2007 | Krishnaprasad et al. |
| 2007/0250560 A1 | 10/2007 | Wein et al. |
| 2008/0002854 A1 | 1/2008 | Tehranchi et al. |
| 2008/0037825 A1 | 2/2008 | Lofgren et al. |
| 2008/0263612 A1 | 10/2008 | Cooper |
| 2008/0288983 A1 | 11/2008 | Johnson et al. |
| 2008/0297654 A1 | 12/2008 | Verberkt et al. |
| 2008/0301304 A1 | 12/2008 | Chitsaz et al. |
| 2009/0010487 A1 | 1/2009 | Maeno |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0037138 A1 | 2/2010 | Shcherbakov et al. |
| 2010/0054531 A1 | 3/2010 | Kogure et al. |
| 2010/0063978 A1 | 3/2010 | Lee et al. |
| 2010/0097494 A1 | 4/2010 | Gum et al. |
| 2010/0111355 A1 | 5/2010 | Petrovic et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2011/0004897 A1 | 1/2011 | Alexander et al. |
| 2011/0058188 A1 | 3/2011 | Guo et al. |
| 2011/0088075 A1 | 4/2011 | Eyer |
| 2011/0099594 A1 | 4/2011 | Chen et al. |
| 2011/0103444 A1 | 5/2011 | Baum et al. |
| 2011/0161086 A1 | 6/2011 | Rodriguez |
| 2011/0164784 A1 | 7/2011 | Grill et al. |
| 2011/0188700 A1 | 8/2011 | Kim et al. |
| 2011/0252342 A1 | 10/2011 | Broman |
| 2011/0261667 A1 | 10/2011 | Ren et al. |
| 2011/0281574 A1 | 11/2011 | Patel et al. |
| 2011/0286625 A1 | 11/2011 | Petrovic et al. |
| 2011/0293090 A1 | 12/2011 | Ayaki et al. |
| 2011/0307545 A1 | 12/2011 | Bouazizi |
| 2011/0320627 A1 | 12/2011 | Landow et al. |
| 2012/0023595 A1 | 1/2012 | Speare et al. |
| 2012/0063635 A1 | 3/2012 | Matsushita et al. |
| 2012/0072731 A1 | 3/2012 | Winograd et al. |
| 2012/0102304 A1 | 4/2012 | Brave |
| 2012/0110138 A1 | 5/2012 | Zhang |
| 2012/0113230 A1 | 5/2012 | Jin |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0007790 A1* | 1/2013 | McMillan ............ H04H 60/43 725/14 |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0077699 A1 | 3/2013 | Gifford et al. |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0159546 A1 | 6/2013 | Thang et al. |
| 2013/0171926 A1 | 7/2013 | Perret et al. |
| 2013/0188923 A1 | 7/2013 | Hartley et al. |
| 2013/0227293 A1 | 8/2013 | Leddy et al. |
| 2013/0246643 A1 | 9/2013 | Luby et al. |
| 2013/0271657 A1 | 10/2013 | Park et al. |
| 2013/0276046 A1 | 10/2013 | Park et al. |
| 2014/0037132 A1 | 2/2014 | Heen et al. |
| 2014/0047475 A1 | 2/2014 | Oh et al. |
| 2014/0059116 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0114456 A1 | 4/2014 | Stavropoulos et al. |
| 2014/0115644 A1 | 4/2014 | Kim et al. |
| 2014/0130087 A1 | 5/2014 | Cho et al. |
| 2014/0142958 A1 | 5/2014 | Sharma et al. |
| 2014/0149395 A1 | 5/2014 | Nakamura et al. |
| 2014/0196071 A1 | 7/2014 | Terpstra et al. |
| 2014/0219495 A1 | 8/2014 | Hua |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0052571 A1 | 2/2015 | Stokking et al. |
| 2015/0063659 A1 | 3/2015 | Poder et al. |
| 2015/0093016 A1 | 4/2015 | Jiang et al. |
| 2015/0121534 A1 | 4/2015 | Zhao et al. |
| 2015/0156536 A1 | 6/2015 | Kim et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0296274 A1 | 10/2015 | Good et al. |
| 2015/0340045 A1 | 11/2015 | Hardwick et al. |
| 2016/0037189 A1 | 2/2016 | Holden et al. |
| 2016/0055606 A1 | 2/2016 | Petrovic et al. |
| 2016/0055607 A1 | 2/2016 | Petrovic et al. |
| 2016/0057317 A1 | 2/2016 | Zhao et al. |
| 2016/0148334 A1 | 5/2016 | Petrovic et al. |
| 2016/0150297 A1 | 5/2016 | Petrovic et al. |
| 2016/0182973 A1 | 6/2016 | Winograd et al. |
| 2016/0241932 A1 | 8/2016 | Winograd et al. |
| 2017/0251282 A1 | 8/2017 | Winograd et al. |
| 2017/0272839 A1 | 9/2017 | Winograd et al. |
| 2017/0280205 A1 | 9/2017 | Winograd et al. |
| 2017/0374434 A1 | 12/2017 | Petrovic et al. |
| 2018/0018748 A1 | 1/2018 | Petrovic et al. |
| 2018/0027306 A1 | 1/2018 | An et al. |
| 2018/0192163 A1 | 7/2018 | Winograd et al. |

FOREIGN PATENT DOCUMENTS

| | | |
|---|---|---|
| CN | 103533343 | 1/2014 |
| EP | 1474924 A2 | 11/2004 |
| EP | 2439735 A1 | 4/2012 |
| EP | 2489181 A2 | 8/2012 |
| EP | 2899720 A1 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |

(56) References Cited

FOREIGN PATENT DOCUMENTS

| | | |
|---|---|---|
| JP | 20100272920 | 12/2010 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 A | 7/2013 |
| KR | 1020130074922 | 7/2013 |
| KR | 101352917 B1 | 1/2014 |
| KR | 10201424049 | 7/2014 |
| WO | 9803014 | 1/1998 |
| WO | 2005017827 | 2/2005 |
| WO | 2005038778 | 4/2005 |
| WO | 2006051043 | 5/2006 |
| WO | WO 2008045880 | 4/2008 |
| WO | 2009031082 | 3/2009 |
| WO | 2010073236 | 7/2010 |
| WO | 2010135687 | 11/2010 |
| WO | 2011046590 A2 | 4/2011 |
| WO | 2011116309 | 9/2011 |
| WO | 2012177126 A1 | 12/2012 |
| WO | 2012177874 | 12/2012 |
| WO | 2013025035 A2 | 2/2013 |
| WO | 2013067439 | 5/2013 |
| WO | 2013163921 | 11/2013 |
| WO | WO 2014014252 | 1/2014 |
| WO | 2015138798 | 9/2015 |
| WO | 2015168697 | 11/2015 |
| WO | 2015174086 A1 | 11/2015 |
| WO | 2016028934 | 2/2016 |
| WO | 2016028936 | 2/2016 |
| WO | 2016029055 | 2/2016 |
| WO | 2016029055 A1 | 2/2016 |
| WO | 2016086047 A1 | 6/2016 |

OTHER PUBLICATIONS

International Search Report and Written Opinion dated Mar. 15, 2016 for International Application No. PCT/US2015/062514, filed Nov. 24, 2015 (10 pages).
International Search Report and Written Opinion dated Apr. 12, 2016 for International Application No. PCT/US2015/066872, filed Dec. 18, 2015 (7 pages).
Office Action dated Jun. 10, 2016 for Korean Patent Application No. 10-2016-7002291 (19 pages).
Office Action dated Jul. 28, 2016 for Korean Patent Application No. 10-2016-7002289 (11 pages).
Office action dated Nov. 30, 2016 for Korean Patent Application No. 10-2016-7002289 (4 pages).
"ATSC-3.0 Automatic Content Recognition Watermarking Solutions," ATSC Technology Group, Advanced Television Systems Committee, Inc., Jan. 2014 (6 pages).
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
International Search Report and Written Opinion dated Aug. 13, 2015 for International Application No. PCT/US2015/029097, filed May 4, 2015 (14 pages).
International Search Report and Written Opinion dated Dec. 7, 2015 for International Application No. PCT/US2015/045960, filed Aug. 19, 2015 (14 pages).
International Search Report and Written Opinion dated Jan. 28, 2016 for International Application No. PCT/US2015/045964, filed Aug. 19, 2015 (8 pages).
International Search Report and Written Opinion dated May 28, 2015 for International Application No. PCT/US2015/020282, filed Mar. 12, 2015 (7 pages).
Kalker, T., et al., "System issues in digital image and video watermarking for copy protection," Proc. IEEE Int. Conf. on Multimedia Computing and Systems, pp. 562-567, Jun. 1999.
Kirovski, D., et al., "Multimedia content screening using a dual watermarking and fingerprinting system," Proceedings of the tenth ACM international conference, pp. 372-381, 2002.
Kirovski, D., et al., "Multimedia content; screening using a dual watermarking and fingerprinting system," Multimedia '02 Proceedings of the tenth ACM international conference on Multimedia, 2002 (11 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
Extended European Search Report dated Sep. 21, 2017 for European Application No. 15762332.3 (9 pages).
Furon, T., "A constructive and unifying framework for zero-bit watermarking," CS.MM, Jan. 12, 2007.
Extended European Search Report dated Nov. 21, 2017 for European Application No. 15785628.7 (7 pages).
"ATSC Candidate Standard: Interactive Services Standard," ATSC Technology Group, Advanced Television Systems Committee, Dec. 2013 (139 pages).
Extended European Search Report dated Feb. 23, 2018 for European Application No. 15833741.0 (8 pages).
Extended European Search Report dated Mar. 5, 2018 for European Application No. 15834491.1 (8 pages).
Extended European Search Report dated Apr. 6, 2018 for European Application No. 15863968.2 (10 pages).
Office action dated Mar. 16, 2018 for Korean Patent Application No. 10-2017-7007558 (10 pages).
Partial Supplementary European Search Report dated Feb. 23, 2018 for European Application No. 15833725.3 (12 pages).
Office action dated Oct. 9, 2018 for Chinese Patent Application No. 201580019496.X (8 pages).
Extended European Search Report dated Jun. 4, 2018 for European Patent Application No. 15833725.3 (11 pages).

* cited by examiner

Payload Data Table

Domain ID: 5837FE00

| Sequence ID | Channel | Media Time | URL |
|---|---|---|---|
| 62801 | XBC-East | 3/1/2014 16:28:43.195 | xbc.tv/p12?e=7.5 |
| 62802 | XBC-East | 3/1/2014 16:29:44.695 | xbc.tv/p12?e=7.5&m=77ee |
| ..... | ..... | ..... | ..... |

FIG. 4

FIG. 8(A)
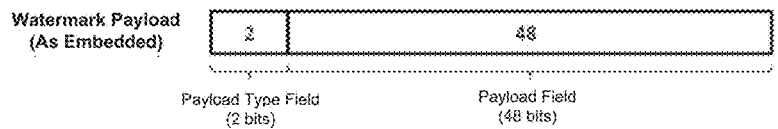
FIG. 8(B)
| Payload Type Field value | Meaning |
|---|---|
| 00b | (Reserved) |
| 01b | Payload Field is of type "Small Domain" |
| 10b | Payload Field is of type "Medium Domain" |
| 11b | Payload Field is of type "Large Domain" |
FIG. 8(C)
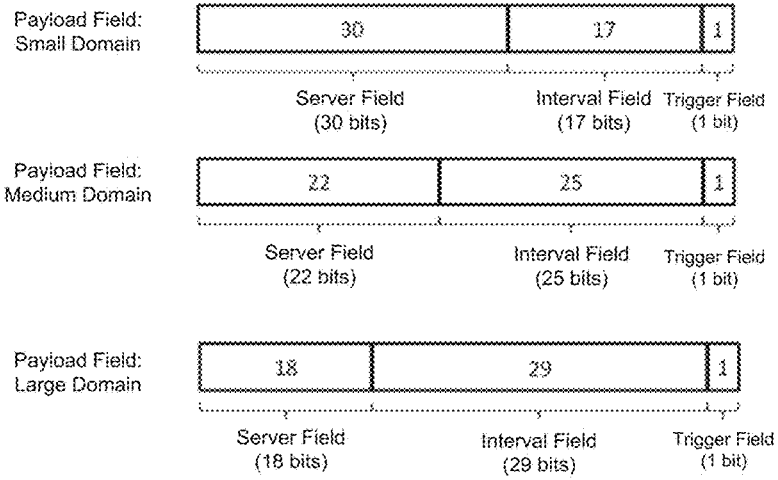

| Domain Type | Server Code Range (hexadecimal) | Interval Code Range (hexadecimal) |
|---|---|---|
| Small Domain | 40000000-7FFFFFFF | 00000000-0001FFFF |
| Medium Domain | 80000000-803FFFFF | 00000000-01FFFFFF |
| Large Domain | C0000000-C003FFFF | 00000000-1FFFFFFF |

FIG. 8(D)

| Domain Type | Number of Domains | Duration Per Domain |
|---|---|---|
| Small | 1,073,741,824 | 54.6 hours |
| Medium | 4,194,304 | 1.59 years |
| Large | 262,144 | 25.5 years |

FIG. 8(E)

Example LOOKUP/QUERY Request (URL):

http://C0001995.vp1.org/query?interval_code=00005AF

{ DNS LOOKUP of metadata server via DNS within a domain administered by an ATSC-sanctioned registrar using detected Server Code }

{ Metadata QUERY via HTTP request using detected interval Code }

Example LOOKUP/QUERY Response (XML):

```
<?xml version="1.0" encoding="UTF-8" ?>
<query version="1.0">
<servercode>C0001995</servercode>
<intervalcode>00005AF</intervalcode>
<serviceID>xyz-west-1</serviceID>
<segmentEDNR>10.5240/F97A-C23A-614A-6BC0-CA36-Q</segmentEDNR>
<intervalStartTime>00:01:00.00</intervalStartTime>
<AIT>
  <ID>827ATS</ID>
  <URL>827ATS/interactive.html</URL>
  <ActivationTime>00:01:30.00</ActivationTime>
  <DeactivationTime>00:02:00.00</DeactivationTime>
</AIT>
<nextQueryTime>00:01:30.00</nextQueryTime>
<nextQuerySlack>1.5</nextQuerySlack>
<segmentEndTime>00:02:00.00</segmentEndTime>
</query>
```

} Response can provide interactive service information that would normally be present in ATSC 3.0 stream (past and future).

FIG. 15(D)

METADATA ACQUISITION USING EMBEDDED WATERMARKS

CROSS REFERENCE TO RELATED APPLICATIONS

This application is a continuation-in-part of U.S. patent application Ser. No. 14/703,434, filed May 4, 2015, which is a continuation-in-part of U.S. patent application Ser. No. 14/656,578, filed Mar. 12, 2015, which claims the benefit of priority of U.S. Provisional Patent Application No. 61/952, 840, filed Mar. 13, 2014, and U.S. Provisional Patent Application No. 61/953,668, filed Mar. 14, 2014. U.S. patent application Ser. No. 14/703,434 also claims the benefit of priority of U.S. Provisional Patent Application No. 61/988, 094, filed May 2, 2014, and U.S. Provisional Patent Application No. 62/005,836, filed on May 30, 2014. This application also claims the benefit of priority of U.S. Provisional Patent Application No. 62/027,163, filed Jul. 21, 2014. The entire contents of the above noted applications are incorporated by reference as part of the disclosure of this document.

TECHNICAL FIELD

The subject matter of this patent document relates to management of multimedia content and more specifically using watermarks to facilitate recognition and utilization of multimedia content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, often consists of a series of related images, which, when shown in succession, can impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, the owner and producer identification of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

The metadata can enable content management, annotation, packaging, and search throughout content production and distribution value chain. Since the introduction of digital TVs, metadata has been introduced to enable digital interactive features and services. Various standardization efforts (such as MPEG-7, MPEG-21. TV-Anytime, DVB-SI, ATSC) strive to produce metadata standards with predefined data structures and transport methods for describing essence to support interoperability and unified services.

While such metadata may be useful in some applications, especially for enabling broadcast interactive services, they must be interleaved, prepended or appended to a multimedia content, which occupies additional bandwidth and, more importantly, can be lost when content is transformed into a different format (such as digital to analog conversion, transcoded into a different file format, etc.), processed (such as transcoding), and/or transmitted through a communication protocol/interface (such as HDMI, adaptive streaming).

BRIEF DESCRIPTION OF THE DRAWINGS

FIG. 4 provides an example of how watermark payload can be associated with media time and interactive content.

FIG. 8(A) illustrates a watermark payload structure in accordance with an exemplary embodiment.

FIG. 8(B) is a table describing Payload Type values in accordance with an exemplary embodiment.

FIG. 8(C) illustrates a structure including Large Domain. Medium Domain, and Small Domain fields in accordance with an exemplary embodiment.

FIG. 8(D) is a table illustrating server code and interval code values in accordance with an exemplary embodiment.

FIG. 8(E) is a table illustrating the number of domains and durations per domain in accordance with an exemplary embodiment.

FIG. 15(D) illustrates exemplary LOOKUP/QUERY request and response associated with the watermarks of FIG. 15(A).

SUMMARY OF CERTAIN EMBODIMENTS

Figure 1:
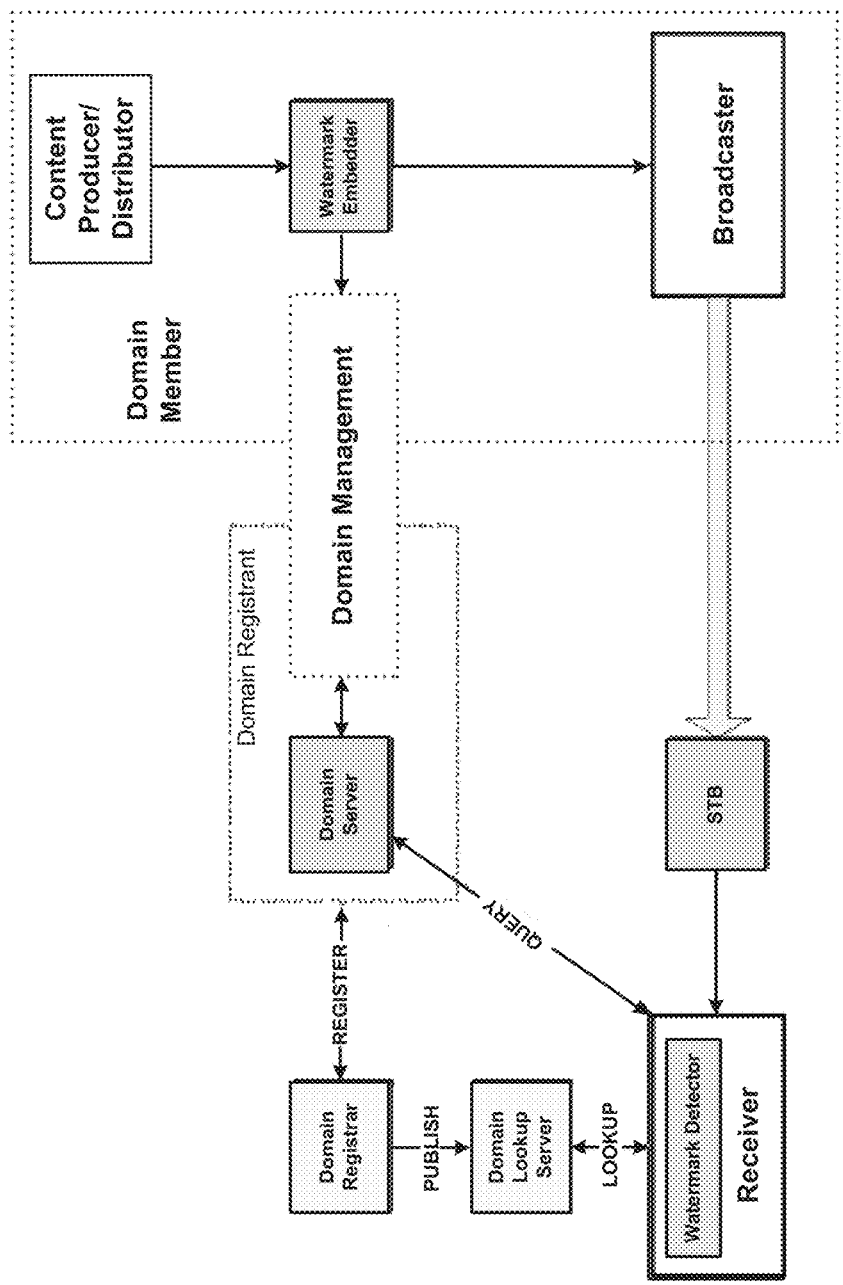
FIG. 1 illustrates a system for providing automatic content recognition and acquisition of interactive content in accordance with an exemplary embodiment.

The disclosed technology facilitates automatic recognition of a content, and enable acquisition of metadata associated with the content.

One aspect of the disclosed embodiments relates to a method for acquiring metadata for a multimedia content that includes receiving the multimedia content at a first device equipped with a watermark detector that is implemented at least partially using electronic circuitry, and conducting watermark extraction operations using the watermark detector to detect a plurality of watermark messages from the multimedia content, where each watermark message includes a server code and an interval code. The method also includes obtaining a server Internet Protocol (IP) address corresponding to a server that stores at least a portion of the metadata associated with the multimedia content, where the IP address corresponds to at least one of the server codes detected from the plurality of watermark messages. The method further includes requesting the metadata from the server having the server IP address, and receiving a response including the metadata associated with the multimedia content.

In one exemplary embodiment, obtaining the sever IP address and requesting the metadata are carried out using a combined lookup and query request that includes a first section and a second section. In this embodiments, the first section includes a lookup portion of the combined lookup and query request and includes the at least one of the server codes detected from the plurality of watermark message. The second section includes a request portion of the combined lookup and query request is formed as a hypertext transfer protocol (HTTP) request and includes the at least one of the interval codes detected from the plurality of watermark messages. In another exemplary embodiment, each watermark message further includes a trigger symbol, and a change in at least one trigger symbol in the plurality of detected watermark messages causes a new request for metadata to be initiated.

According to one exemplary embodiment, the response includes all of the following: an Interval Start Time indicative of a starting time of a segment of the multimedia content that carries the at least one of the interval codes detected from the plurality of watermark messages; an identification value uniquely identifying a program that at least one watermarked segment of the multimedia content is part of, a service identification value indicative of a service associated with at least one watermarked segment of the multimedia content; an activation time value indicative of a stating time at which an application or service associated with the multimedia content is available for activation; a next query time indicative of an earliest time at which a new query for an event or service is permitted to occur; and a next query slack indicative of a time duration during which a new query is allowed to occur.

According to another exemplary embodiment, the response includes one or more of: a specific server code that is identical to one of the server codes detected from the plurality of watermark messages; a specific interval code that is identical to one of the interval codes detected from the plurality of watermark messages; an Interval Start Time indicative of a starting time of a segment of the multimedia content that carries the at least one of the interval codes or server codes detected from the plurality of watermark messages; an identification value uniquely identifying a program that at least one watermarked segment of the multimedia content is part of; a service identification value indicative of a service associated with at least one watermarked segment of the multimedia content; an activation time value indicative of a stating time at which an application or service associated with the multimedia content is available for activation; a deactivation time value indicative of time at which an application or service associated with at least one segment of the multimedia content is terminated; a next query time value indicative of an earliest time at which a new query for an event or service is permitted to occur; or a next query slack indicative of a time duration during which a new query is allowed to occur.

In another exemplary embodiment, the above method further includes using the watermark detector to detect an additional set of plurality of watermark messages embedded in the content, where the additional set of plurality of watermark messages correspond to a second watermarking layer that is distinct from a first watermarking layer that includes the plurality of watermark messages. The second plurality of watermark messages have performance requirements or properties that are different from the plurality of watermark messages in the first watermarking layer. In one exemplary embodiment, the additional set of plurality of watermark messages include a second server code and a second interval code that differ respectively from at least one of the server codes and the interval codes of the plurality of watermarks of the first watermarking layer. In yet another exemplary embodiment, the performance requirements or properties that differ between the plurality of the watermarks of the first watermarking layer and the additional set of plurality of watermarks of the second watermarking layer include one or more of: a payload size, a frequency, a throughput, a robustness, an error rate, an audio quality, or a metadata protocol.

Another aspect of the disclosed embodiments relates to a device that includes a processor, and a memory including processor executable code. The processor executable code upon execution by the processor configures the device to receive a multimedia content at the device, and conduct watermark extraction operations to detect a plurality of watermark messages from the multimedia content, where each watermark message includes a server code and an interval code. The processor executable code upon execution by the processor further configures the device to obtain a server Internet Protocol (IP) address corresponding to a server that stores at least a portion of the metadata associated with the multimedia content, where the IP address corresponds to at least one of the server codes detected from the plurality of watermark messages. The processor executable code upon execution by the processor also configures the device to request the metadata from the server having the server IP address, and receive a response including the metadata associated with the multimedia content.

In one exemplary embodiment, the sever IP address and request for the metadata are carried out through a combined lookup and query request that includes a first section and a second section, where the first section includes a lookup portion of the combined lookup and query request and includes the at least one of the server codes detected from the plurality of watermark messages, and the second section includes a request portion of the combined lookup and query request formed as a hypertext transfer protocol (HTTP) request and includes the at least one of the interval codes detected from the plurality of watermark messages. In another exemplary embodiment, each watermark message further includes a trigger symbol, and the processor executable code upon execution by the processor configures the device to initiate a new request for metadata upon detection of a change in at least one trigger symbol in the plurality of detected watermark messages.

In yet another exemplary embodiment, the processor executable code upon execution by the processor further configures the device to detect an additional set of plurality of watermark messages embedded in the content, where the additional set of plurality of watermark messages correspond to a second watermarking layer that is distinct from a first watermarking layer that includes the plurality of watermark messages, and the second plurality of watermark messages have performance requirements or properties that are different from the plurality of watermark messages in the first watermarking layer.

Another aspect of the disclosed embodiments relates to a computer program product, embodied on one or more non-transitory computer readable media, that includes program code for receiving the multimedia content at a first device equipped with a watermark detector that is implemented at least partially using electronic circuitry. The program product further includes program code for conducting watermark extraction operations using the watermark detector to detect a plurality of watermark messages from the multimedia content, where each watermark message includes a server code and an interval code, as well as program code for obtaining a server Internet Protocol (IP) address corresponding to a server that stores at least a portion of the metadata associated with the multimedia content, where the IP address corresponds to at least one of the server codes detected from the plurality of watermark messages. The program product also includes program code for requesting the metadata from the server having the server IP address, and program code for receiving a response including the metadata associated with the multimedia content.

Another aspect of the disclosed embodiments relates to a method for providing metadata associated with a multimedia content, that includes receiving a query at a metadata server, the query having been initiated by a requesting device coupled to a network, and where the query includes an interval code having been obtained from a watermark message embedded in the multimedia content. The metadata server is uniquely identifiable by an Internet Protocol (IP) address obtained based on a server code of the watermark message embedded in the multimedia content. The method further includes transmitting a response to the query based on information in the received query. The response includes at least a portion of metadata including all of the following: an Interval Start Time indicative of a starting time of a segment of the multimedia content that carries the interval code; an identification value uniquely identifying a program that at least one watermarked segment of the multimedia content is part of: a service identification value indicative of a service associated with at least one watermarked segment of the multimedia content; an activation time value indicative of a stating time at which an application or service associated with the multimedia content is available for activation; a next query time indicative of an earliest time at which a new query for an event or service is permitted to occur, and a next query slack indicative of a time duration during which a new query is allowed to occur.

According to one exemplary embodiment, the above method further includes, in response to the query, providing an interactive content to the requesting device that is based on the received interval code. In one exemplary embodiment, the above method further includes receiving at least a portion of the metadata from an additional server that is associated with a server registrant device or a content provider device, and storing the at least a portion of the metadata at the metadata server. In yet another exemplary embodiment, the above method further includes receiving an interactive content from the additional server that is associated with the content provider device and storing the received interactive content at the metadata server.

Another aspect of the disclosed embodiments relates to a server device that includes at least one processor, a non-transitory data storage device configured to store one or more of metadata or interactive multimedia content, and a memory, comprising processor executable code. The processor executable code when executed by one of the at least one processor configures to server device to receive a query at a metadata server, the query having been initiated by a requesting device coupled to a network, where the query includes an interval code having been obtained from a watermark message embedded in the multimedia content, and where the metadata server is uniquely identifiable by an Internet Protocol (IP) address obtained based on a server code of the watermark message embedded in the multimedia content. The processor executable code when executed by one of the at least one processor further configures to server device to transmit a response to the query based on information in the received query, where the response includes at least a portion of metadata including all of the following: an Interval Start Time indicative of a starting time of a segment of the multimedia content that carries the interval code; an identification value uniquely identifying a program that at least one watermarked segment of the multimedia content is part of; a service identification value indicative of a service associated with at least one watermarked segment of the multimedia content; an activation time value indicative of a stating time at which an application or service associated with the multimedia content is available for activation; a next query time indicative of an earliest time at which a new query for an event or service is permitted to occur; and a next query slack indicative of a time duration during which a new query is allowed to occur.

Another aspect of the disclosed embodiments relates to a computer program product, embodied on one or more non-transitory computer readable media, that includes program code for receiving a query at a metadata server, the query having been initiated by a requesting device coupled to a network, where the query includes an interval code having been obtained from a watermark message embedded in the multimedia content, and where the metadata server is uniquely identifiable by an Internet Protocol (IP) address obtained based on a server code of the watermark message embedded in the multimedia content. The computer program product further includes program code for transmitting a response to the query based on information in the received query, where the response comprising at least a portion of metadata includes all of the following: an Interval Start Time indicative of a starting time of a segment of the multimedia content that carries the interval code; an identification value uniquely identifying a program that at least one watermarked segment of the multimedia content is part of: a service identification value indicative of a service associated with at least one watermarked segment of the multimedia content; an activation time value indicative of a stating time at which an application or service associated with the multimedia content is available for activation; a next query time indicative of an earliest time at which a new query for an event or service is permitted to occur, and a next query slack indicative of a time duration during which a new query is allowed to occur.

Another aspect of the disclosed embodiments relates to a method for acquiring metadata for a multimedia content that includes receiving the multimedia content at a first device equipped with a watermark detector that is implemented at least partially using electronic circuitry, conducting watermark extraction operations using the watermark detector to detect a plurality of watermark messages from the multimedia content, where each watermark message including a server code and an interval code. The method further includes obtaining a server Internet Protocol (IP) address corresponding to a server that stores at least a portion of the metadata associated with the multimedia content, where the IP address corresponds to at least one of the server codes detected from the plurality of watermark messages. The method also includes requesting the metadata from the server having the server IP address, and, at the server, receiving a request including the at least one of the detected interval codes and transmitting a response based on information in the received in the request to the first device. The method further includes receiving, at the first device, a response from the server, where the response includes the metadata associated with the multimedia content that is formed based in-part on the at least one of the interval codes detected from the plurality of watermark messages.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, typical techniques for incorporating metadata into multimedia content often rely on interleaving, prepending or appending the metadata fields or packets with the associated multimedia content. These techniques have proven to be unreliable under certain circumstances, such as when the multimedia content is transformed into a different format, which can cause the metadata to be lost. Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

The disclosed embodiments enable automatic content recognition (ACR) using embedded watermarks. The watermarks can be embedded in the audio and/or video portions of a content and are substantially imperceptible to a viewer (or listener) of the content. The watermarks are also immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like. Once detected by a watermark detector (also sometimes referred to as a watermark extractor), the payload of the watermark can be used to identify the content, as well as the current temporal position (timing information) of the content being viewed, and recover the metadata associated with the identified content and temporal position to enable various operations, such as receiving an additional content, performing dynamic advertising insertion, or participating in an interactive opportunity. The viewing device (or an associated device) is connected to the Internet (or more generally, to a remote database) for the retrieval of the additional content, for participating in the interactive opportunities or other services.

The disclosed embodiments further comply with the requirements of the Advanced Television Systems Committee (ATSC), Inc., Call for Proposals For ATSC-3.0 AUTOMATIC CONTENT RECOGNITION WATERMARKING SOLUTIONS-ATSC Technology Group 3 (ATSC 3.0) (S33 Doc. 067r3). In particular, some embodiments provide for the embedding of watermarks using a watermark inserter into a content at a content source, that is subsequently transmitted to a MVPD, which provides the content to a set-top box (or similar device) at consumers' homes. The content that comes from the set-top box (typically via a HDMI interface) is presented on a viewing device ("Receiver") that is compliant with ATSC 3.0 standard. The uncompressed audio/video at the viewing device includes embedded watermarks that enables the identification of the content and the current position of the content being viewed. The identified content and the current temporal position of the content are used to recover the metadata that enables the viewing device to receive additional contents, services or features associated with the presented content. It should be noted that while in some embodiments, a receiver (sometime also referred to as a receiver device) is a separate component than the set-top box, in other variations a receiver device may include, or be part of a larger device that includes, any one or combinations of additional components such as a set-top box a display, keyboard or other user interface devices, or a watermark detector, as well as processors (e.g., microprocessors, digital signal processors (DSPs), etc.) and other circuitry that may be needed for implementation of such device, or devices.

In some embodiments of the present application, the information conveyed by the embedded watermarks allows a viewing device to identify the channel currently being watched and recognize a channel change within a short period of time (e.g., 2 seconds). Further, the information conveyed by the embedded watermarks allows a viewing device to identify the content and the current position of the content being viewed, including short content such as interstitials. Information conveyed by the embedded watermarks also allows a viewing device to discover a remote location (for example a URL of a remote server) for accessing metadata information about the content and associated services. It allows a viewing device to identify the temporal position within the content being rendered, to a level of per sample or access unit accuracy. Additionally, the information conveyed by the embedded watermarks allows a viewing device to receive a time-sensitive event trigger in real time which may activate the viewing device to perform various operations such as requesting for the metadata from the remote location.

The methods, systems, devices and computer program products that are described in this document further enable centralized management of the high-level namespace associated with the watermarks and, at the same time, enable decentralized namespace lookup. The disclosed embodiments further allow key points of interoperability to be standardized to achieve independent management of watermarks within a namespace, as well as distributed and independent operation and management of related data services associated with individual broadcast content.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. Clients use a lookup service to find the domain name associations. A standardized query is used to obtain metadata matching a Sequence ID from servers in the domain. Note that the domain name associated with a Domain ID that is registered with the Domain Registrar for use in the Domain Lookup Service may be the same domain name that is used to serve interactive services for broadcast content that has the associated Domain ID embedded in a watermark within it or it may be a different domain name from which is used to serve the associated interactive services. A Sequence ID can be used to identify a content and the current temporal position of the content being viewed within the domain specified by the Domain ID.

Example Watermark Payload:

According to an exemplary embodiment, a 50-bit payload is embedded in every 1.5 seconds of the content. In this exemplary embodiment, the watermark payload can be standardized with the following structure: [Payload Type:2] [Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload.

In some exemplary embodiments, the payload structure for each payload type is defined as follows:

Small Domain: [Domain field:30 bits][Sequence field:17 bits][Trigger field: bit]

Medium Domain: [Domain field:22 bits][Sequence field: 25 bits][Trigger field:1 bit]

Large Domain: [Domain field: 18 bits][Sequence field:29 bits][Trigger field:1 bit]

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), informs the Receiver of an event that may activate the Receiver to perform various operations such as requesting metadata from the domain server. It indicates that further services or features, such as interactive content or advertising insertion associated with the Sequence ID should be available to the Receiver from the domain server associated with the payload's Domain ID. In some implementations the trigger field can include multiple bits. In some implementations, the trigger field may be used for other purposes. For example, a field can be defined as an "overwriteable" bit which indicates whether or not a preexisting watermark previously embedded by a content distributor or content producer can be replaced by another distributor (this is sometimes referred to as watermark "replacing"). In this case, a watermark embedder first checks for the presence of a watermark payload, and verifies the value of such 'overwriteable' bit if a payload is preset, and decides if a new watermark payload can be embedded to replace the pre-existing one according to the value of the bit. In another example, another field can be defined as an "over-watermarkable" bit which indicates whether or not a new watermark payload can be embedded in the content to co-exists with a pre-existing one so that both can be extracted (this is sometimes referred to as watermark "layering"). In some implementations, additional fields may be added into the watermark payload structure to support these two exemplary use cases. Because the "overwritable" bit and/or "over-watermarkable" bit is associated with a content segment identified by a Sequence ID, each segment of a content may set these bits differently; thus, allowing some segments to be overwritable and/or over-watermarkable.

In another embodiment, authorization of overwriting watermarks or over-watermarking can be performed via a domain server. Such authorization may be associated with one or more Domain IDs and/or Sequence IDs. When a watermark embedder detects a pre-existing watermark payload, it sends the payload to a domain server according to the Domain ID of the payload, and receives a response indicating whether such payload can be replaced by a new payload or a new payload can be layered on top of the pre-existing one.

In some cases, a content distributor may want to check the services enabled by the pre-existing watermark payload before making a decision to replace the pre-existing payloads or layer new payloads in some or all content segments. The distributor can query the domain servers identified by the pre-existing payload for all relevant metadata identifying the services, inspect it, select metadata associated with some content segments, and post the selected metadata to the domain servers preferred by such distributor. The distributor can introduce new services associated with the pre-existing payloads. Alternatively, the distributor can also embed new payloads into some segments and associate new services with these segments enabled by the new payloads on the domain server. Furthermore, it is also possible for the distributor to embed new payloads in some segments on top of pre-existing payloads. Thus, both new payloads and pre-existing payloads can be detected and provided to a domain server, a receiver may receive multiple triggers identified by the new payload or the pre-existing payload associated with a segment. The receiver may choose the services caused by one of the triggers according to user preference or pre-configuration, or bring all services caused by multiple triggers to the user.

One of the services caused by triggers may be presentation of a secondary audiovisual content, typically delivered via Internet, such as pre-fetched advertisements. Such audiovisual content is treated as regular audiovisual content, i.e., it can also be watermarked and watermark-based triggers can be registered with a domain server. Thus, the watermark payloads in the secondary content can also trigger interactive services. This is sometimes called "nested triggers".

In an alternative embodiment, the watermark embedder always overwrites existing watermarks, but keeps track of preexisting watermarks, and their relationship to newly embedded watermarks, and informs the domain server about it. This is particularly useful for live broadcasts, where examining the content for preexisting watermarks can go in parallel with watermark embedding/overwriting without causing any latency in the overwriting process. For example, the domain server can be informed that at the moment when the embedding of watermark with payload X has begun, the preexisting watermark with payload Y has been found, where the preexisting watermark begins T milliseconds before the newly embedded watermark. With this information, the domain server can later, when queried with payload X, calculate the timeline of preexisting watermarks, and provide the metadata about services in synchronization with timeline of the payload Y.

In yet another embodiment, multiple watermarks can be embedded into the same content using distinct watermark embedding parameters. For example, content producer may use one set of parameters for its watermark, but content distributor may have a distinct parameter set that produces watermarks that substantially do not interfere with detection of content producer watermarks. Alternatively, embedding of watermarks with distinct parameters may be used to increase watermark code space, or overall watermark data throughput. This way, sometimes referred to as watermark layering, multiple watermarks may be detected by a receiver, and the receiver may access domain servers associated with each of them and obtain multiple services.

Using the above watermark payload structures, if we assume that a watermark payload has temporal duration of 1.5 seconds, over 250,000 Large Domains can be identified (e.g. for long-term continuous embedding) that would allow 25.5 years of uniquely marked content per domain. This structure further allows over 4 Million Medium domains to be uniquely identified (e.g. for continuous marking of Olympics-scale events, annual channel assignments, or long-term selective embedding) that would allow 1.5 years of uniquely marked content per domain. The structure for Small Domains allows unique identification of over 1 Billion Small Domains (e.g. shows) with 54 hours of uniquely marked content per domain. Depending on the payload type, a domain may be assigned to one or more 1) broadcasters or content producers; 2) MVPDs; 3) channels; 4) sport events; 5) shows; 6) movies; or 7) episodes.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Often, a watermark payload is repeatedly embedded in multiple portions of the host content to improve the detection reliability of the embedded watermarks. Once embedded, the embedded content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

FIG. 1 illustrates a system for providing automatic content recognition for content that is provided by a broadcaster to a consumer device and acquisition of interactive content in accordance with an exemplary embodiment. The content is embedded with watermarks by a Domain Member prior to broadcast. For example, such a Domain Member can be a content producer or a Broadcaster. A Broadcaster transmits the content to one or more user premises. Such content is often received at a receiver such as a set top box (STB), where decompression and formatting operations may take place before the content is provided to the Receiver. Decompression and formatting may alternatively take place within the Receiver. The Receiver which includes a watermark detector, examines the received content for the presence of watermarks. The detection of watermarks may trigger further actions such as identifying a domain name associated with the detected watermark payload and sending a query to an identified domain server.

The Domain Registrar in FIG. 1 is a unique centralized entity responsible for registering Domain IDs and publishing the mapping between Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Referring again to FIG. 1, Domain Registrants are responsible for coordinating the use of Sequence IDs in watermarks by one or more Domain Members. The Domain Registrant may be a member of its domain. The Domain Registrant is also responsible for registering a domain name (to be associated with its assigned Domain ID) with the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. In some embodiments, the use of a standardized LOOKUP protocol is necessary to obtain interoperability between any Receiver and any Domain Lookup Server, but does not need to be mandatory on either the Receivers or Domain Lookup Server(s) because a Receiver manufacturer can direct all lookup queries from devices that they manufacture to a private Domain Lookup Service and employ a non-standard protocol to do so. In some embodiments the Receivers are ATSC-compatible or ATSC-complaint. That is, those receivers comply with ATSC requirements, such as those under ATSC 3.0.

Domain Servers are Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

Domain Management:

Domains are managed via coordinated interaction between a Domain Registrant and Domain Members (entities within a domain). Domain Management includes allocation of Sequence IDs within the domain to Domain Members, assignment of Sequence IDs to content segments, management of Sequence ID usage by watermark embedders, and/or distribution of metadata associated with Sequence IDs to Domain Servers. Standardization of protocols or processes for these functions may be valuable to obtain interoperability of professional systems, but is not essential for interoperability of devices. Domain Management may include analysis of the digital broadcast stream which contains both audiovisual broadcast content and multiplexed digital metadata to decode both watermarks and embedded digital metadata and automatically establish the association between watermark payloads present in the audio and video essence of the broadcast content and digital metadata present and associated with the same essence in the broadcast stream for population of the Domain Servers. Domain Management may also include functions and interfaces that allow broadcasters or content producers to edit the metadata extracted from the broadcast content or add new metadata for population of the Domain Servers.

The previously described watermark structure that comprises a domain identifier (Domain ID), a sequence identifier (Sequence ID) and a trigger field, can be used as an alternative method to deliver metadata (signaling) to receivers, and is of particular utility in scenarios where the receiver has access to the essence of the broadcast content (i.e. its audio and video) but not the complete digital broadcast stream which contains the metadata (signaling) in a multiplexed digital data stream. This may happen if the receiver obtains the broadcast content from an interface that does not include the portion of the multiplexed broadcast stream which includes the triggers, such as over an analog or HDMI interface. In such a scenario, the following exemplary sequence of operations can be implemented to allow a user to obtain the full set of features associated with the full broadcast content, as well as additional features that are enabled through the use of the disclosed technology. The exemplary sequence of operations is as follows. First, the name of a network server from which the metadata can be accessed ("domain name") is identified. Next, the identified server is queried to obtain the associated metadata. In one exemplary embodiment, the process of retrieving a metadata can be accomplished by placing a set trigger bit in a particular watermark payload to cause receivers to imitate the trigger retrieval process.

According to one exemplary embodiment, the Sequence IDs in a Domain are dynamically allocated to Domain Members by a Domain Manager (which performs Domain Management functions). Moreover, the Embedders of a Domain Member may be deployed in multiple facilities in various locations. They are managed by and connected with a Domain Member Embedder Manager via Internet, an enterprise network, or another appropriate communication link. A block of Sequence IDs (which can include one or more continuous Sequence IDs) may initially be allocated for each Embedder. When an Embedder needs more Sequence IDs, it sends a request to its Domain Member Embedder Manager for a new block of Sequence IDs. Such a request may be sent prior to performing watermark embedding or when the number of remaining Sequence IDs reaches a predefined number. Similarly, a Domain Manager initially allocates one or more blocks of Sequence IDs to a Member Embedder Manager. When a Member Embedder Manager needs more Sequence IDs, it sends a request to its Domain Manager for a new Sequence IDs. Both the Domain Manager and Domain Member Embedder Manager ensure that each Embedder has adequate Sequence IDs. In addition to Sequence ID allocation, a Domain Member Embedder Manager can also configure each Embedder it manages, including the Domain ID of the watermark payload to be embedded by such Embedder and other embedding parameters. It also collects the embedding logs and metadata of watermarked content from the Embedders and reports them to a Domain Manager. A Domain Manager may use this data for registering the allocated Sequence IDs and associating Sequence IDs with content segments and associated metadata in the Domain Server as described earlier.

Figure 2:
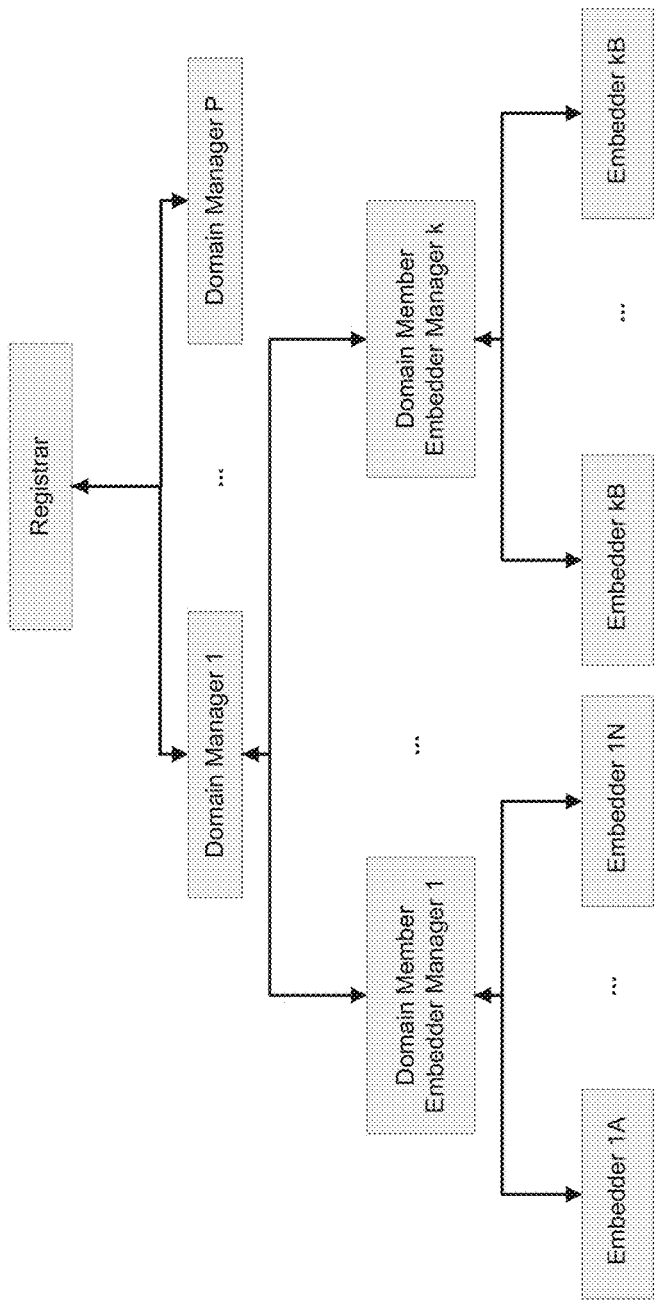
FIG. 2 illustrates a diagram of how a Registrar. Domain Managers, Domain Member Embedder Managers and Embedders can be connected in a hierarchical structure in accordance with an exemplary embodiment.

FIG. 2 illustrates a diagram of how a Registrar. Domain Managers, Domain Member Embedder Managers and Embedders can be connected in a hierarchical structure in accordance with an exemplary embodiment. As shown in FIG. 2, each Domain Member Embedder Manager (e.g., Domain Member Embedder Manager 1) may be associated with a plurality of Embedders (Embedders 1A through 1N), each Domain Manager (e.g., Domain Manager 1) can be associated with a plurality of Domain Member Embedder Managers (e.g., Domain Member Embedder Managers 1 through k), and a Registrar may be associated with a plurality of Domain Managers (e.g., Domain Managers 1 through P).

In one exemplary embodiment, a Domain can have more than one Domain Servers, each of which may serve a specific region and/or a Domain Member. In this case, the lookup services can be provided by a cluster of lookup servers in a hierarchical structure. For example, a Registrar level server first maps a Domain ID provided by a Receiver to a domain-level lookup server; and then such domain-level lookup server resolves the Domain ID to a specific Domain server.

Referring again to FIG. 1, the Receivers and Domain Lookup Services employ a standardized message protocol (e.g., designated as LOOKUP in FIG. 1) to query a Domain Lookup Service to provide the domain name associated with a Domain ID. The Domain ID-to-domain name mapping can be cached locally in the Receiver and the cache can be timed out periodically (e.g. with a time-to-live value) or refreshed as needed (e.g. if a server fails to respond). This protocol enables interoperability between all receivers (e.g., ATSC receivers) and all Domain Lookup Services. As noted earlier, support for a standardized LOOKUP protocol need not be mandatory for either the Receivers or the Domain Lookup Services because a receiver manufacturer (e.g., an ATSC receiver manufacturer) could provide their own domain lookup service and use a proprietary protocol for their interaction. Receiver manufacturers should be permitted to associate their receivers with a Domain Lookup Service of their choosing and may permit end-users to select a Domain Lookup Service to use. For one or more Domain IDs, Receiver manufacturers may also choose to use an alternate domain server whose name is registered with the Domain Registrar. For such Domain IDs, it is the responsibility of that manufacturer to ensure that they direct those queries to a domain server which is populated with timely and correct metadata associated with the Domain IDs and Segment IDs identified in the received watermark payloads. In such instances, the domain server may be populated as previously described from real-time analysis of the complete digital broadcast stream.

Referring again to FIG. 1, the Receiver employs a watermark detector to scan content it receives for a watermark payload. The receiver may activate the watermark detector only for content received separately from a complete digital broadcast stream and/or from a specific broadcast channel. When a watermark payload is detected, a Receiver may request associated metadata by querying an associated Domain Server. The trigger bit set in a watermark payload is a "hint" to the device that interactive content associated with the Sequence ID should be available from the domain server associated with the payload's Domain ID. The Receiver may therefore use the presence of the trigger bit set as the basis for determining when to initiate a Domain Server query. The Receiver may further choose to initiate a Domain Server query in other contexts, such as when a watermark payload is detected after content playback has begun (e.g. after the Receiver is first turned on), after channel change, after network connectivity is restored following a period of interruption, or when a signaling is provided in a previous trigger that such 'hint' may be ignored.

In implementations that use the trigger bit, such a bit can support the use case where a broadcaster chooses to embed the watermark throughout its content (may be for other applications; e.g. audience measurement, advertisement tracking, etc.) but only signals the availability of special content (e.g., ATSC-compatible interactive content) for certain portions of the content. In the absence of such trigger bit, millions of TV sets may attempt to query their server when there is no interactive content available. It should be noted that in some implementations the trigger bit is not needed. For example, when a receiver queries triggers from a domain server, it may request for a set of triggers for a particular duration of the content to reduce the query traffic.

The queried domain server responds to the Receiver's query by providing the stored metadata associated with the provided watermark payload information. The Receivers may then use the metadata received from the domain server to access, configure, and execute interactive services. Such metadata may include, but is not limited to, a broadcast channel identifier, an identifier that uniquely identifies the broadcast content and broadcast segment, a timecode, a trigger, an event or an action, supplement content, advertising content, or a server location (e.g., URL) where the above can be obtained. The Receivers should be resilient to an absent, delayed, or malformed response from a domain server.

The following provides an exemplary scenario in which the trigger field may be used to obtain metadata that enables additional features related to the content. In some implementations, where the timeline of a broadcast is broken into contiguous "segments" of content (e.g., show, ad, ad, promo, ad, show), for individual segments, metadata may be associated with particular moments on the segment timeline. The trigger field indicates whether or not such metadata is available. The metadata may contain instructions for how, when, or under what conditions a receiver should load and execute particular content or service, such as an interactive service associated for the segment. The metadata may identify an Internet server from which the interactive services can be loaded. The metadata may additionally identify a segment which is being displayed with which, e.g., the interactive services are associated. The metadata may additionally identify one or more parameters for when and how, e.g., the interactive service should be configured.

Figure 3:
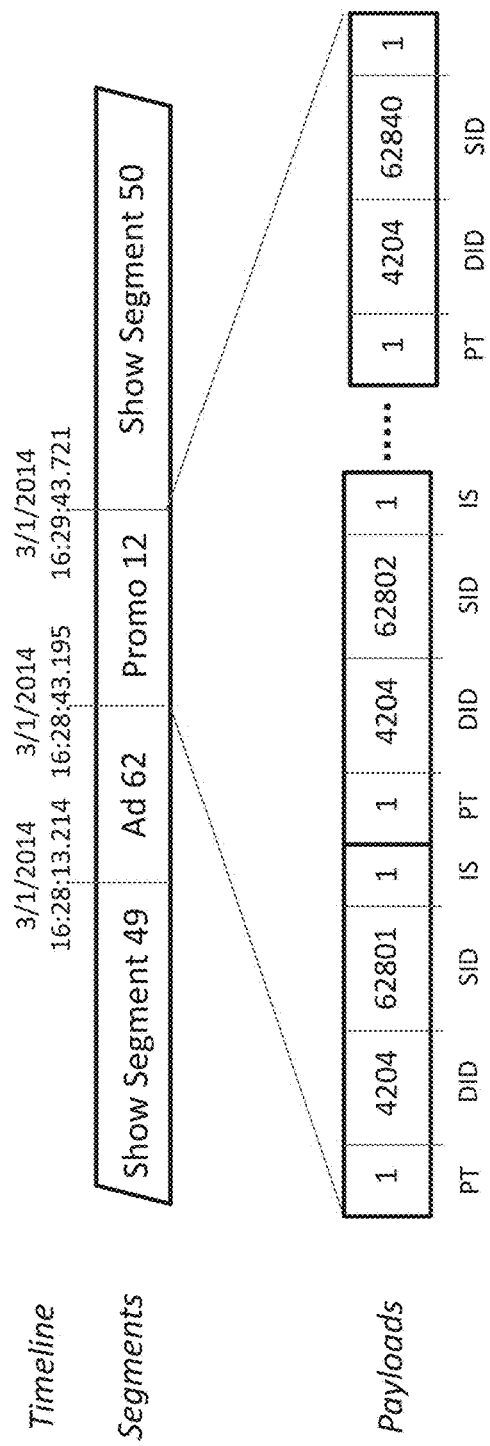
FIG. 3 illustrates the relationship between the timeline of a broadcast content and the embedded watermarks in accordance with an exemplary embodiment.

FIG. 3 illustrates the relationship between the timeline of a broadcast content and the embedded watermarks in accordance with an exemplary embodiment. The depicted broadcast content timeline includes two broadcast segments of the main program (i.e., show segments 49 and 50), an advertisement segment 62 and a promo segment 12. The lower part of FIG. 3 illustrates the payload of the watermark embedded in the promo segment 12 that includes a payload type (PT) field (shown as having a value of 1), a domain ID (DID), a segment ID (SID) and a trigger field (IS). FIG. 3 shows consecutive SID values (62801 to 62840) that are embedded in each of 40 segments within the promo segment 12. The DID value for all 40 segments is 4204, the payload type is 1, and the trigger field is set to 1.

FIG. 4 provides an example of how watermark payload can be associated with media time and interactive content in accordance with exemplary embodiments. In particular, the table in FIG. 4 shows that the Sequence ID 62801 within the Domain ID 5837FE00 is associated with media time 16:28:43.195, and is mapped to XBC-East channel, which is associated with an interactive feature that can be accessed from the URL xbc.tv/p12?e=7.5. Similarly, FIG. 4 shows that Sequence ID 62802 is associated with media time 16:29:44.695, and is mapped to XBC-East channel, which is associated with an interactive feature that can be accessed from the URL xbc.tv/p12?e=7.5&m=77ee. The table that is illustrated in FIG. 4 can be stored at a Domain Server and selected data can be provided to the Receivers in response to queries.

Figure 5A:
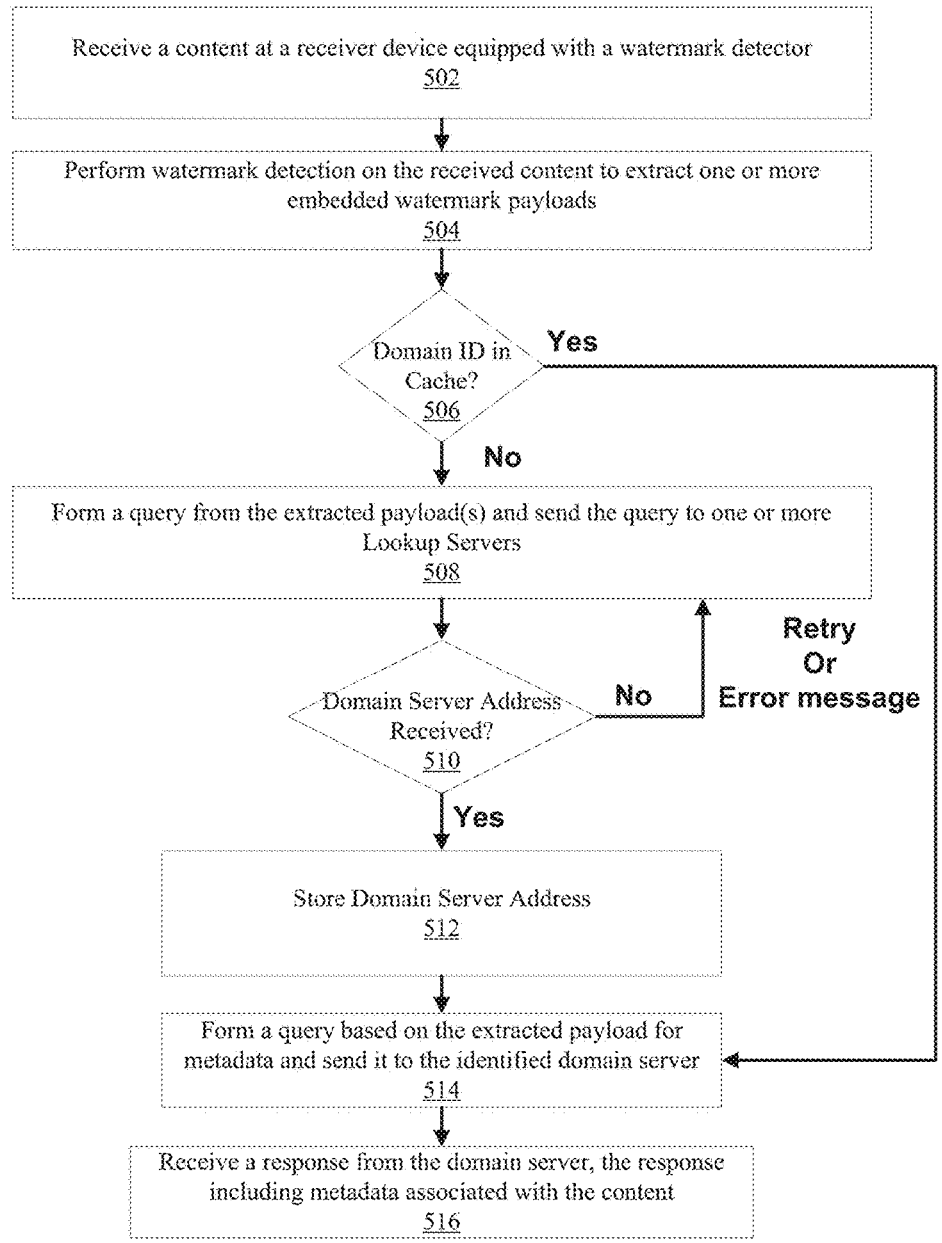
FIG. 5(A) illustrates a set of exemplary operations that can be carried out to provide automatic content recognition and to acquire associated metadata in accordance with an exemplary embodiment.

FIG. 5(A) illustrates a set of exemplary operations that may be carried out to provide automatic content recognition and to acquire associated metadata in accordance with an exemplary embodiment. The operations in FIG. 5(A) can be carried out by a receiver (such as the Receiver shown in FIG. 1). At 502, a content is received at a receiver device equipped with a watermark detector. The received content can, for example, be in uncompressed format. In some embodiments, the content may arrive at the receiver in compressed format and be decompressed within the receiver prior to watermark detection. At 504, watermark detection is performed on the received content to extract one or more embedded watermark payloads. At 506, it is determined whether or not the Domain ID from the extracted watermark payload is in the cache of the receiver. If the Domain ID is cached, the operations continue at 514. If the Domain ID does not reside in cache (or other local storage), at 508, the receiver forms a query from the extracted payload and sends the query to a Lookup Server to lookup a domain server corresponding to the Domain ID in the extracted payload. In some implementations, the URLs of one or more Lookup Servers are pre-configured in the receiver. At 510, it is determined whether or not the receiver receives a domain server address (e.g., a URL) and upon reception of the domain server address, the receiver, at 512, stores the Domain ID with the corresponding domain server address in the cache and, at 514, the receiver forms a query based on the extracted payload for metadata and sends it to the identified domain server. At 516, a response to the query is received from the domain server, the response includes metadata associated with the content. If the Lookup server fails to respond, the receiver may try another Lookup server. After failure of at least two trials, the receiver may notify the user of the error message.

Figure 5B:
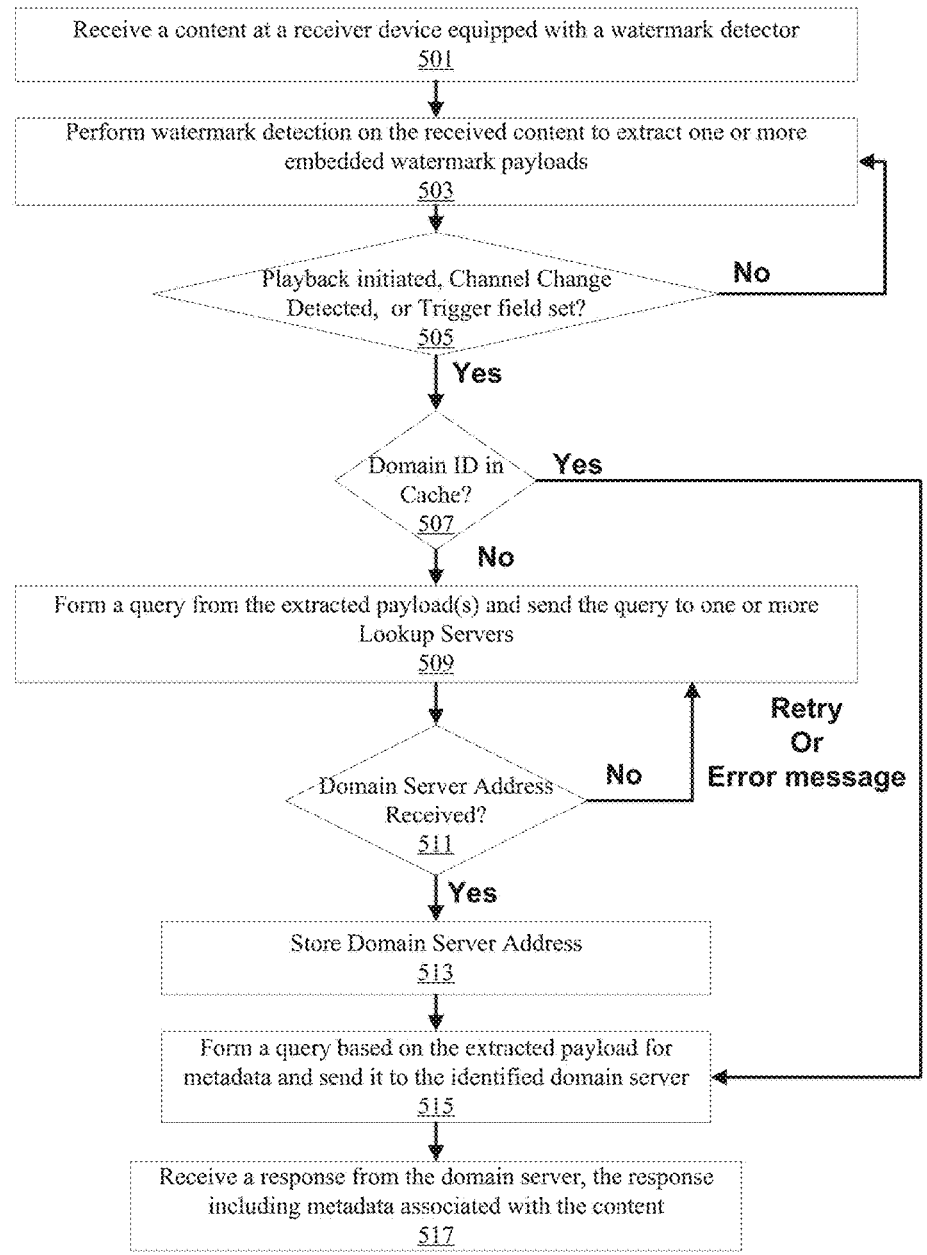
FIG. 5(B) illustrates a set of exemplary operations that can be carried out to provide automatic content recognition and to acquire associated metadata in accordance with an exemplary embodiment.

FIG. 5(B) illustrates a set of exemplary operations that may be carried out to provide automatic content recognition and to acquire associated metadata in accordance with an exemplary embodiment. The operations in FIG. 5(B) are similar to those in FIG. 5(A) but further emphasize the conditions that provide a hint to the receiver to initiate a query to the server. In particular, after receiving a content (at 501) and performing watermark detection (at 503), it is determined at 505 if the playback is initiated, a channel change is detected, or the trigger field is set. For example, such a determination can provide an affirmative answer (YES) if the trigger field (e.g., the trigger bit) is set to "1" or if the trigger field value has changed from a previously detected trigger field value. Such a determination can also provide an affirmative answer (YES), when, for example, the detected watermark is a first one after content playback begins or the first one after a channel change has occurred. If the determination at the 505 is a NO, the operations return to 503, where additional watermarks from the received content are detected. If the determination at 505 results in a YES, the operations continue to 507, where it is determined whether or not the Domain ID corresponding to the detected watermark is stored in cache. The operations 507, 509, 511, 513, 515 and 517 in FIG. 5(B) are similar to the previously described operations 506, 508, 510, 512, 514 and 516 of FIG. 5(A), respectively.

VP1 Watermark:

One specific example implementation of the disclosed technology is fully compatible with requirements set forth in the call for proposals ("CfP") for ATSC-3.0 Automatic Content Recognition Watermarking Solutions. Such an implementation provides a flexible, decentralized and scalable Internet-based system architecture that employs a particular watermark, called VP1, in conjunction with a collection of standardized communication protocols and a lightweight administrative process that enable any connected ATSC Receiver to fully recover ATSC-3.0 broadcast stream metadata which has been lost over interfaces which do not carry the full broadcast stream. Such an architecture supports the server-based usage model outlined in the CfP, but also enables a more open, decentralized, and efficient architecture that obviates receiver manufacturers of the requirement to provide ACR services or contract metadata services, and enables this function to be provided by the same Content and Signaling Servers that support interactive services enabled in ATSC Receivers via direct access to the full ATSC broadcast stream. One function which must be centralized in this architecture, however, is a domain registrar (e.g., a Server Registrar), which runs a lightweight administrative process for assigning blocks of watermark codes to registrants and publishes a database of the registrations to service providers. (This function may be operated by ATSC or an administrative entity designated by it.) All other functions are open and decentralized and can be operated by broadcasters, receiver manufacturers, or third-party service providers. Such an architecture offers significant market and operational benefits by avoiding the need for any service provider to aggregate and publish metadata associated with multiple broadcast streams. Similarly, ATCS receiver manufacturers are not required to engage with a commercial service provider to aggregate and publish metadata associated with all broadcast streams.

The VP1 watermark is transparent, robust and erasable, and supports reliable signaling through channels ranging from heavily compressed IP network distribution, to current broadcasts and to emerging enhanced and immersive audio formats. The watermark enables interoperability between any conforming VP1 embedder, eraser, and detector. The distributed architecture of for embedding and management of watermarks permits maximum flexibility and freedom as to how content providers, cont ent distributors, and compliant receivers (e.g., ATSC 3.0 receivers) interact with architecture components. In this architecture, not only a standardized watermark technology is established but also a code management scheme and network protocols are specified which together enable any connected ATSC Receiver to fully recover ATSC 3.0 broadcast stream metadata (including all "information to convey" described in the CfP) directly from servers designated by the broadcaster without the need for an ACR service provider to be engaged by receiver manufacturers and interposed between the viewer and a broadcaster's interactive service.

The VP1 watermark and the associated system architecture are based upon the use of a 50-bit watermark data payload which has a 1.5 second duration in the marked content. A single detected watermark is sufficient to synchronize the receiver with the timecode of the embedded content with frame (e.g., millisecond) accuracy and recover any lost metadata and interactive services associated with the original broadcast stream. The VP1 watermark may be embedded continuously in content for subsequent detection such that:

(a) The audio quality is "near transparent" (i.e. a difference grade with a 95% confidence lower bound greater than −0.5) under the test conditions of ITU BS-1116-1 "Subjective Assessment of Small Audio Impairments;"

(b) The mean-time-to-first-detection of the payload is less than 3 seconds for broadcast content subjected to HE AAC v2 at 48 kbps;

(c) False detections (i.e., detected reported from unembedded content) and erroneous detections (i.e., detection of data payload different from what is embedded in the content) are reported by the detector with frequency not greater than once per 5 years of continuous detection; note that the data payload obtained in the case of a false or erroneous detection is considered to have a random value uniformly distributed across the range of defined codes. Since many possible code values will not be associated with broadcast content, the frequency of user-facing errors resulting from false or erroneous detections will be substantially less than the above (i.e., will be even further apart than 5 years).

(d) Embedding of the VP1 watermark requires not more than 20 mega instructions per second (MIPS) of processing per 48 kHz audio channel;

(e) Detection of the VP1 watermark requires not more than 10 MIPS of processing per multichannel audio program.

Additionally, VP1 watermark supports overwriting of watermarks and erasure of watermarks to enable any party in the content production or distribution chain to control all downstream watermark functionality. VP1 further supports the carriage of additional orthogonal watermark data channels (often referred to as "layers") containing other data payloads for other applications.

Figure 6:
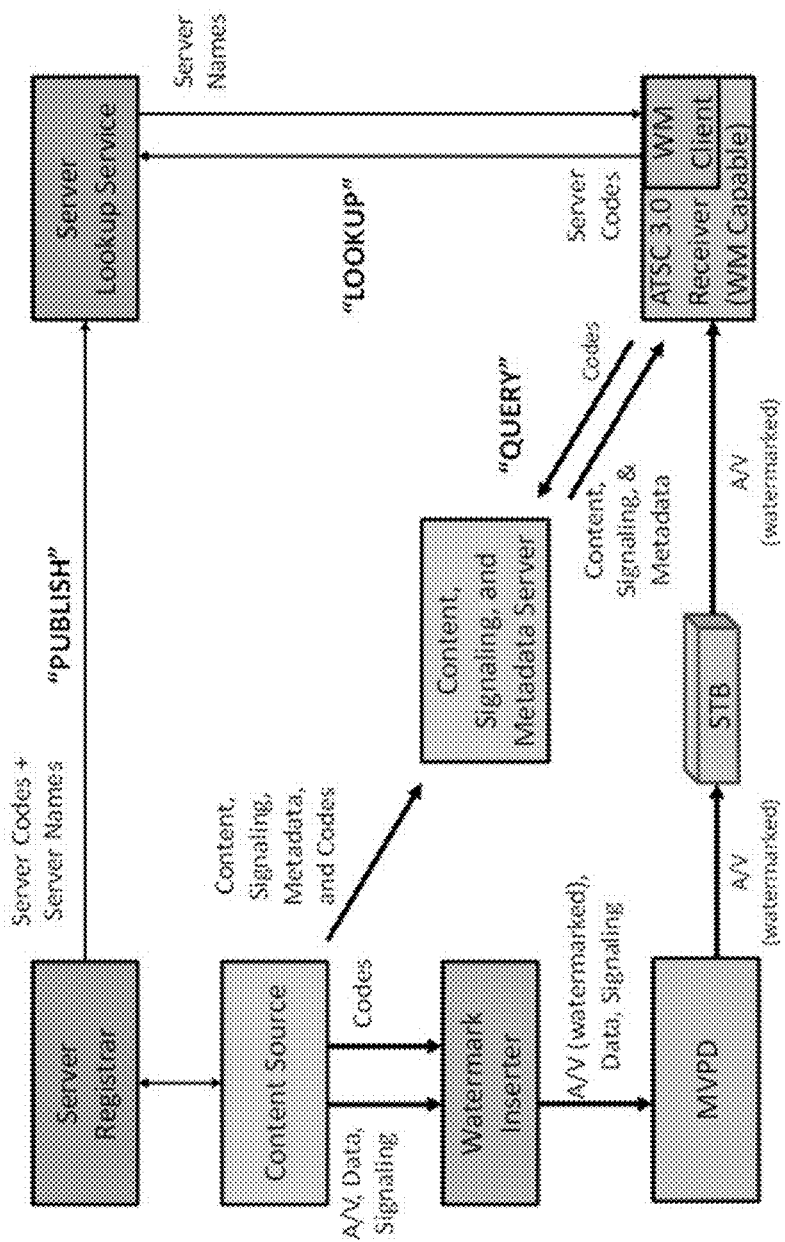
FIG. 6 illustrates a system and associated components that enables automatic content recognition and acquisition of corresponding metadata in accordance with an exemplary embodiment.

The distributed system architecture associated with the VP1 watermark enables not only standardization of the watermark technology, but also includes a standardized code management scheme and three network protocols. An illustration of the architecture, which is compatible with the approach set forth in FIG. 2 of the CfP, is provided in FIG. 6. With reference to FIG. 6, the code management (or domain management) scheme, system component functionality, and necessary protocols are described in the following sections.

Figure 7:
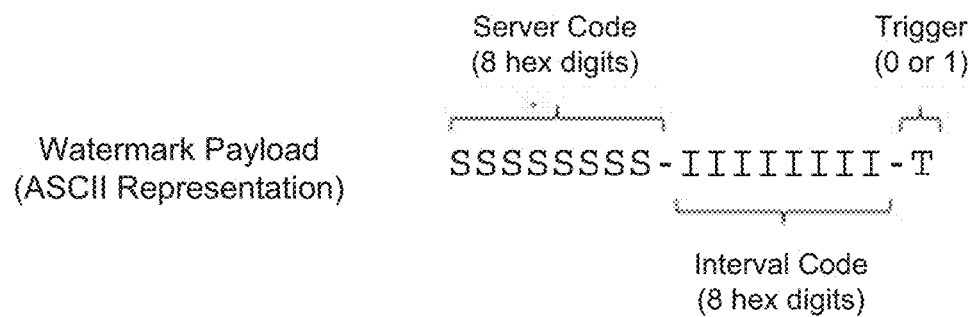
FIG. 7 illustrates a watermark payload structure in accordance with an exemplary embodiment.

Similar to the previously describes watermark payload structure, the VP1 watermark includes a watermark payload with three fields. These fields carry a Server Code, an Interval Code, and a Trigger. It should be noted that the fields of VP1 watermark payload structure conform to the previously described watermark structure, with Sever Code and Interval Code being analogous to the Domain ID and a Sequence ID. An exemplary VP1 watermark structure is shown in FIG. 7. The Server Code is a value which is registered with a central authority designated by a Server Registrar (e.g., ATSC) that provides a mechanism for dividing the watermark code space among independent code-issuing entities (e.g., Server Registrants). For example, a Server Code can be registered by a content producer that wants to manage and use codes within content that they produce, a network that wants to manage and use codes within content that they distribute, or a service provider that wants to manage interactive services on their behalf. These independent code-issuing entities are sometimes referred to as "ATSC Domains" because the Server Code can also provide a one-to-one mapping to an Internet domain. The domain identifiers are recorded by the Server Registrar, are published to Server Lookup Services which maintain copies of the registration database, and can be accessed by receivers to discover the Internet domain name at which they can access servers hosting metadata associated with content embedded with that Server Code.

The Server Registrant is responsible for coordinating the management of all Interval Codes associated with their assigned Server Code. Each Interval Code value can be associated uniquely with a specific interval of an instance of broadcast content. In some implementations, the interval is equal to the watermark duration (e.g., 1.5 seconds) but can be longer in circumstances where there is no need to enable a receiver to identify timing within the interval. We refer to the range of codes defined by an assigned Server Code and all associated Interval Codes as a Code Domain. The Trigger field of the VP1 watermark is a Boolean signal from the Content Source to the ATSC Receiver indicating that the ATSC Receiver should query for new interactive service content.

It should be noted that several components that are shown in FIG. 6 can find analogous counterparts in FIG. 1. For example, the Server Registrar and the Domain Registrar; the Content, Signaling and Metadata Server and Domain Server, and the Server Lookup Service/server and Domain Lookup Server can carry out analogous operations. The various components in FIG. 6 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes, may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc.; these are referred to as the "information to convey" in the CfP. It should be noted that while metadata services can be hosted in the same servers as the content and signaling services, they may alternatively be hosted on different servers from those used for content and signaling services.

ATSC Receivers may obtain broadcast content essence absent the full ATSC broadcast stream from an MVPD via a STB. The ATSC receiver may provide the content essence to the watermark client for detection of any embedded codes. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

When the watermark client detects a watermark payload embedded in the content it is playing, it checks to see whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc. Timecode metadata provided to watermark clients by the CSM Server can be used in conjunction with data recovered from the watermark detection process to determine the original media timecode of the broadcast content with frame or millisecond accuracy.

To enable the architecture that is depicted in FIG. 6, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

The CfP further describes a scenario in its FIG. 2, where the associated architecture relies on having receivers programmed to access a metadata server designated by receiver manufacturer with all of their watermark-related requests. The disclosed architecture of the present application supports the use of this approach by receiver manufacturers who wish to employ such a model. In such an arrangement, (where the italicized terminology is taken from FIG. 2 of the CfP) the code DB and metadata server can be populated by any metadata server operator with access to the full broadcast stream for all broadcasters in a region. The same service provider can perform watermark detection and metadata recovery from the broadcast stream to populate their Code DB for use by the metadata server. Since the watermark specification is open, the Content Source need not use a Watermark Inserter affiliated with any particular metadata server operator and any metadata sever operator can recover the watermarks embedded by any broadcaster.

As a very specific example, the code DB and the Content and Signaling Server can be populated by any automatic content recognition (ACR) service provider with access to the full broadcast stream for all broadcasters in a region. The ACR service provider can perform watermark detection and metadata recovery from the broadcast stream to populate their Code DB for use by the Content and Signaling Server. Since the watermark specification is open, the Content Source need not use a Watermark Inserter affiliated with any particular ACR service provider and any ACR service provider can recover the watermarks embedded by any broadcaster.

ATSC receivers within such a closed ecosystem need not employ the LOOKUP or QUERY protocols and can instead rely on the private protocols for accessing services within this private ecosystem created by the metadata server operator (e.g., by the ACR service provider). Such receivers can seamlessly coexist alongside other ATSC receivers that employ the standardized protocols and infrastructure that is described in the present application.

The following provides a detailed example of a code structure and payload encoding in accordance with certain embodiments of the present application. The representational structure that previously described in connection with FIG. 7, supports a larger space than a 50-bit payload. In the sections that follow, we define a subset of that code space that can be suitably used to provide the needed signaling in more efficient manner, we further describe a proposed approach for encoding into the watermark payload.

FIG. 8(A) illustrates an exemplary watermark structure in accordance with an exemplary embodiment. As illustrated in FIG. 8(A), the 50-bit watermark payload is divided into two top-level fields; the Payload Type field (2 bits) and the Payload Field (48 bits). The Payload Type field describes the format of the Payload Field, with the mapping as shown in FIG. 8(B). The structure of the Large Domain, Medium Domain, and Small Domain fields are as shown in FIG. 8(C). Each of the 48-bit payload fields in FIG. 8(C) includes a Server Field, an Interval Field and a Trigger Field.

The Server Code is related to the Server Field for any of the three domain types by ((PT<<30)+SF), where <<30 is bit-wise left shift by 30 bits, PT is the Payload Type value and SF is the Server Field value. FIG. 8(D) provides a listing of the supported range of Server Codes and the supported range of Interval Codes per Code Domain with this approach. Codes outside of the supported range are considered to be reserved. This arrangement, which supports allocation of Code Domains of varying size, aids in efficient code space usage. The table in FIG. 8(E) summarizes the number of domains of each type that can be allocated with the above approach and the amount of continuously broadcast, uniquely embedded content that each domain type can support (assuming 1 unique code per 1.5 seconds of broadcast content). Server registrants may select the size of domain (small, medium, or large) needed at the time of registration.

Server Location Via Watermark Codes:

The disclosed distributed system architecture can employ a Server Codes registration process and decentralized Server Lookup Services to enable receivers to locate CSM servers. The following provides further details for certain implementations of the disclosed server lookup techniques.

HTTP Queries:

The LOOKUP protocol may employ HTTP queries. With this approach, the receiver contains a stored Internet address (e.g. domain name or IP address) for a Server Lookup Service. This address may be pre-programmed into the receiver by its manufacturer and may be modifiable by the end-user. The Server Lookup Service stores a database of associations between Server Codes and Server Names. This database is constructed from information obtained from the registrar using the registrar's PUBLISH protocol. The PUBLISH protocol may be implemented using any of a variety of protocols for transmitting information and synchronizing databases. Updates to the registration database are likely to be infrequent but it is desirable that they be made available to Server Lookup Services quickly, so it is advantageous for the protocol that enables these updates to be distributed using a "push" protocol. One simple example for how the registrar may publish new and updated registrations is the IP protocol Simple Mail Transfer Protocol (SMTP). The registrar could maintain a list of email addresses of subscribing Server Lookup Services and send them updated records via SMTP when registration database changes occur. The transmissions could be authenticated using authentication mechanisms (e.g. digital signatures) to provide database security. It may also be advantageous to support a "pull" mechanism for a new or corrupted Server Lookup Service to obtain a complete record of the registration database, e.g. via HTTP transfer from a web server at a standardized URL.

In one exemplary implementation, the LOOKUP is initiated by a receiver that has detected a watermark comprising a Server Code. The receiver may perform a LOOKUP prior to each QUERY, or it may have a cache of Server Code/Server Name associations, in which case LOOKUP may be triggered by the receiver not having a cache entry for the Server Code which maps it to a server Internet address. The LOOKUP may alternatively triggered if the receiver has a cache entry for that Server Code which is out-of-date (e.g. its time-to-live has expired). The LOOKUP may alternatively be triggered if the receiver has a cache entry for that Server Code, but one or more attempts to contact the Server Code at the Internet address stored in the cache entry have failed, indicating that the cache entry is not current.

The LOOKUP protocol may be initiated by an HTTP request from the receiver to the Internet address of the Server Lookup Service with the LOOKUP query formatted in a standardized way within the URL (e.g. in a specified format compliant with RFC 1738 and/or RFC 3986). An example of such a query string is:
http://serverlookup.vp1.com/lookup?server_code=C0001995

In this example the lookup query string. "serverlookup.vp1.com" is the domain name of the Server Lookup Service, "lookup" is a fixed string indicating that the request is employing the Lookup protocol, and "C0001995" is the Server Code value that was detected in broadcast content and is the subject of the query. The Server Lookup Service may respond to the request with a reply (e.g., an XML-formatted reply) which conforms with a standardized LOOKUP protocol schema and contains information associated with the requested Server Code. An example of such a response to the receiver's LOOKUP request is:

```
<?xml version="1.0" encoding="UTF-8" ?>
<lookup version="1.0">
<servercode>C0001995</servercode>
```

```
<servername>interactive.abc.com</servername>
<lookup>
```

In the above example, the response indicates that the server name corresponding the server code C0001995 is interactive.abc.com. The response may also include additional or alternate information, such as providing the Server Name in IP address format, a time-to-live value for the association, the date/time of the last change to the mapping, or other relevant information. Once the receiver has obtained the server name, it submits a QUERY to the identified metadata server to recover metadata associated with the broadcast segment in which the watermark code was embedded and the payload interval (e.g. broadcast segment identifier or Interval Code, channel number, interactive applications, triggers, timecode, etc.).

In one exemplary implementation, the QUERY may similarly employ an HTTP query structure. The query may be initiated by an HTTP request submitted by the receiver to the metadata server (e.g., the CSM server) in a standardized format. An example of such a QUERY string is:
http://interactive.abc.com/query?server_code=C0001995&interval_code=00005AF Provision of the Server Code in the QUERY request is valuable to disambiguate the Interval Code from among multiple potential Server Code spaces because the metadata Server Code to Server Name mapping could be one-to-many (i.e. the "interactive.abc.com" server may be responding to queries for content across multiple Server Codes). In one exemplary implementation, the metadata server may respond to the QUERY request with an XML-formatted reply conforming to a specified QUERY protocol schema and containing information associated with the identified content interval. An example of such a response is:

```
<?xml version="1.0" encoding="UTF-8" ?>
<query version="1.0">
<servercode>C0001995</servercode>
<intervalcode>000005AF</intervalcode>
<segmentEIDR>10.5240/F57A-623A-614A-8AC0-CA36-Q</segmentEIDR>
<intervalStartTime>00:18:42.08</intervalStartTime>
<segmentEndTime>00:22:13.00<segmentEndTime>
<segmentApp>interactive.abc.com/F57A623A614A8AC0CA36Q/827A753/interactive.html</segmentApp>
</query>
```

In the above example QUERY response, the metadata server identifies the Server Code (C0001995) and Interval Code (000005AF) for which the response is applicable, provides an identifier (10.5240/F57A-623A-614A-8AC0-CA36-Q) (e.g., an industry standard identifier) for the audiovisual work contained in the broadcast segment, identifies the start timecode (00:18:42.08) within the audiovisual work associated with the beginning of the time interval over which the watermark code containing the Server Code and Interval Code is embedded, identifies the end timecode (00:22:13.00) in the audiovisual work that is associated with the end of the broadcast segment described by this response, and identifies a URL (interactive.abc.com/F57A623A614A8AC0CA36Q/827A753/interactive.html) at which an interactive application (or other content) associated with the broadcast segment may be accessed by the receiver.

DNS Queries:

In some exemplary implementations, the PUBLISH and LOOKUP protocols may alternately be built upon the existing Domain Name Service (DNS) (also sometimes referred to as Domain Name System) protocols which are designed to facilitate name resolution for other applications on IP networks. DNS is a distributed, recursive system in which multiple DNS servers of different types that operate in a decentralized but coordinated fashion can allow a receiver to identify the Internet address of a server. Use of the DNS protocols enables a variety of different arrangements to be achieved. Some of the advantages associated with the disclosed implementations that use DNS include (1) improved security because the Registrar can ensure that receivers are directed only to servers operated by legitimate content providers; (2) ease of implementation since all Internet-connected devices include DNS capability, which allows leveraging of the existing protocols; (3) scalability of implementations since DNS is highly scalable, distributed and resilient, which allows a large number of receivers to simultaneously perform LOOKUP; (4) compatibility of DNS implementations since they allow use of Content Distribution Network (CDN) (sometimes also referred to as "Content Delivery Network) technologies which can deliver different server addresses to different clients depending on the client location as indicated by their IP address; (5) efficiency of implementations by enabling compact encoding within the watermark payload in comparison to, for example, encoding a full 128 bit IPv6 server address; and (6) flexibility of implementation since DNS mapping at registrar can be changed from time to time as needed. For example, if content ownership transfers from one entity to another entity after distribution of the content, the server mapping can be changed at the Registrar to point to the servers of the new owner without requiring any change to the data encoded into the watermark of content which has already been distributed.

Several example embodiments of described below, each of which employs multiple DNS servers of various types providing Server Lookup Service functions using DNS protocols. In these examples, an Internet domain is established by the Server Registrar to represent the primary domain for Server Lookup Services. By way of example, this primary domain is vp1.org. This domain name is registered with an Internet domain name registrar. The Server Registrar establishes a DNS server as the authoritative DNS server for this primary domain and publishes its database of associations between Server Codes and Server Names by loading the database directly into this authoritative primary domain server as, e.g., a configuration file. In this arrangement, the Server Codes can take the form of hostnames (and possibly subdomains) within the primary domain. There are a variety of useful ways in which this can be done. Some example embodiments are described below.

First Exemplary DNS Approach:

Each assigned server code may be mapped to a fully formed hostname by prepending the Server Code as a host in the primary domain, such as representing the entry for Server Code C00001995 in a hostname of the form C0001995.vp1.com. The configuration file for the DNS server may contain address table records which map hostnames representing Server Codes to a Server Name expressed in the form of an IP address. An example of this address table record, expressed in the format used by BIND configuration file format, is an entry such as:

C0001995.vp1.com. IN A 172.18.20.3

In this example, IN indicates that the record class is for Internet hosts and addresses, and A indicates the type of record is IPv4. This example in a BIND configuration file expresses to the DNS server that the computer with hostname C0001995.vp1.com can be reached on the Internet at IPv4 address 172.18.20.3. This example is expressed using the BIND configuration format and using IPv4 addressing, but it should be recognized that other similar DNS server configuration methods and IPv6 or other addressing schemes can be used to achieve an equivalent function.

When a receiver detects, from the content that it is receiving, a watermark that includes a server code, it can perform a LOOKUP using DNS and QUERY using HTTP by forming a URL with a standardized structure that includes a hostname portion constructed using the Server Code combined with the fixed registrar primary domain name and followed by an HTTP query string that includes the Interval Code. For the exemplary Server Code C0001995, and interval code (000005AF) described above, the constructed hostname has the form (C0001995.vp1.com) and such a LOOKUP/QUERY has the form:

http://C0001995.vp1.com/query?interval_code=000005AF.

In the above HTTP query, the receiver first employs DNS to obtain the IP address of the CSM Server (e.g., the metadata server) associated with the broadcast content (e.g., the C0001995.vp1.com section of the request), and then submits an HTTP request containing the HTTP query string (query?interval_code=000005AF) to the CSM Server at that address using the interval code. It is understood that, using the DNS protocol and LOOKUP may involve communication with multiple DNS servers, resolvers, caches, etc. in the process of determining the IP address associated with the appropriate CSM Server to which the QUERY should be submitted.

For another example, using the example Server Code and registrar primary domain name values and with the example Interval Code value 000005AF, the HTTP query string can have the form:

http://C0001995.vp1.com/query?server_code=C0001995&interval_code=000005AF

Other DNS Approaches

Domain Delegation:

The example described under the heading "First Exemplary DNS Approach" requires that each CSM Server have a fixed IP address and that that IP address be maintained as current in the registrar's DNS server. This may limit the ability of the CSM Servers to be operated in content delivery network (CDN) environments where IP addressing may be variable and specific to the individual queries and may also introduce an undesirable administrative burden on the registrar to maintain a current DNS database.

In one exemplary embodiment, the registrar's DNS server can delegate authoritative control over DNS lookup requests associated with a given Server Code to a DNS server operated by the Server Code's registrant. In this embodiment, the registrant can provide the registrar with the hostname of a DNS server under its control which will act as the Server Lookup Service for LOOKUP queries related to their Server Code. The registrar configures its DNS server so that queries related to that Server Code are directed to the registrant's designated DNS server for resolution.

For example, if Server Code value C0000195 is registered to ABC network, ABC could notify the registrar that LOOKUP queries for this Server Code should be directed to a DNS server which they operate at hostname ns.interactive.abc.com. The registrar can configure their DNS server to delegate DNS requests for the subdomain C0000195.vp1.com for resolution by the DNS server ns.interactive.abc.com, which ABC network can configure to resolve DNS queries from receivers as needed (e.g. with dynamically updated CSM Server IP addresses, CDN-like routing to geographically distributed servers based on the receiver location, etc.). In one example, using BIND DNS formatting, the registrar servers can be configured to perform such delegation by including the following resource record in the DNS server configuration file:
C0000195.vp1.com. 86400 IN NS ns.interactive.abc.com.

In this example resource record, 86400 represents the Time To Live (TTL) for the resource record, NS indicates that this record provides a nameserver mapping. This example, specifies ns.interactive.abc.com as the name server for the domain C0000195.vp1.com.

Hierarchical Hostname Splitting:

The Server Code may be mapped into hostnames in such a way as to split the Server Code across multiple subdomains in a similar manner to that used for reverse DNS lookup. Such arrangements facilitate the registrar's distributing responsibility for providing authoritative DNS servers for contiguous ranges of Server Codes of varying sizes across different parties or DNS server machines using the DNS delegation capability. Examples of such splitting include 001995.C0.vp1.com (which would divide the subdomains for small, medium and large server codes) or 5.9.9.9.1.0.0.0.C.vp1.com (which would allow subdomains to be divided into ranges with size equal of powers of 16). Such methods can change the format of the fixed hostname string used by receivers in their QUERY protocol requests, as well as the need to be standardized.

Figure 9:
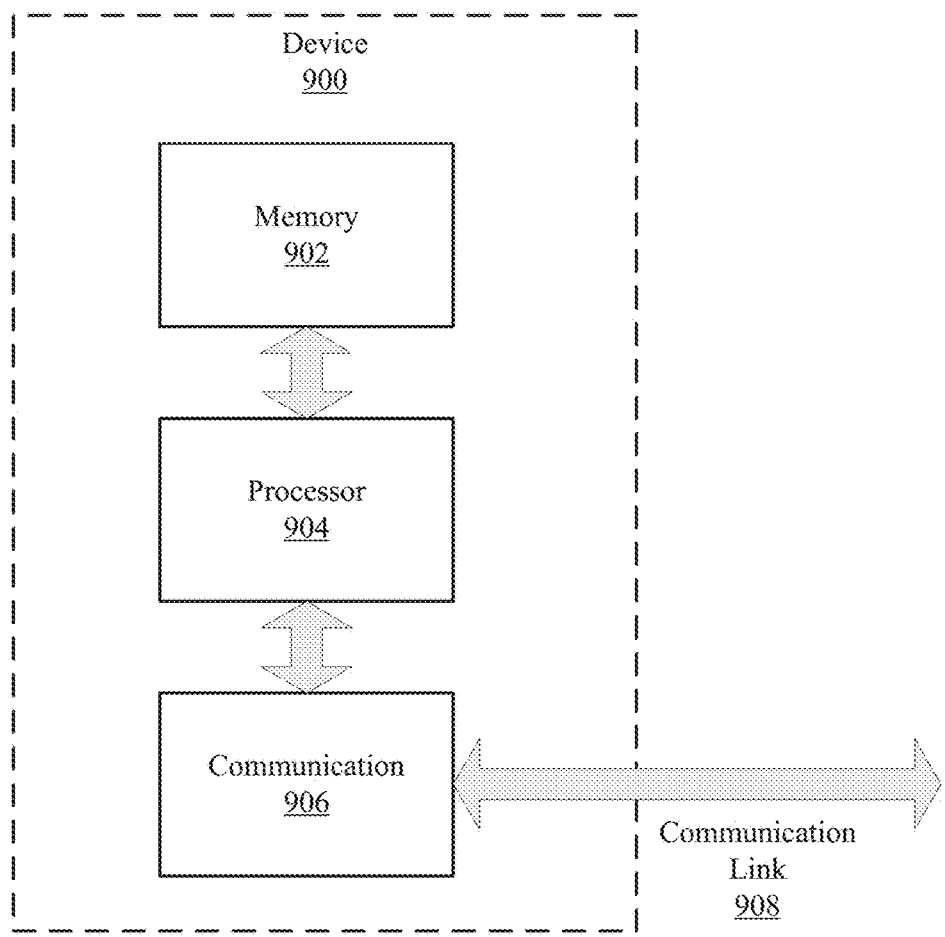
FIG. 9 illustrates a block diagram of a device within which various disclosed embodiments may be implemented.

Certain Aspects of Standardization Approach:

The watermark structure and the associated architecture can be better understood using the exemplary layering architecture that is shown in FIG. 1. The illustrated hierarchical watermark architecture includes a Stream Layer, a Segment Layer, a Payload Layer, a Data Link Layer and a Physical Layer. The smallest identifiable data at the physical layer is an audio sample at the physical layer; a specific number of audio samples host a watermark symbol at the Data Link Layer, and a specific number of watermark symbols form a watermark payload at the payload layer. FIG. 9 also shows that each watermark payload can be mapped to a watermark code. An example of such a mapping was previously described in connection with FIGS. 8(A) to 8(D). Each watermark segment at the segment layer can include a plurality of watermark codes. The watermark segments can be embedded into one or more layers of the broadcast stream. For example, one or more channels of a 5.1 audio stream can have corresponding watermark codes embedded therein.

Each layer has an associated specification that describes how mapping from one layer to another layer is accomplished. Examples of the content of such specifications are provided below.

A Physical Layer specification defines the signal characteristics which map baseband audio samples representing broadcast audio in various formats (e.g. sampling rate, bit resolution) to a sequence of watermark symbols. This specification identifies the signal modulation and symbol encoding scheme for carriage of watermark data and, by implication, audio processing steps which may be employed for embedding, erasure, and detection of watermark symbols from audio signals. A Data Link Layer specification defines the symbol grammar that maps a sequence of watermark symbols to a valid watermark payload. This specification identifies the internal structure of a valid watermark, including the mechanisms employed in the watermark for facilitating synchronization, data transmission, control signaling, error correction, and error detection between a VP1 embedder and detector. A Payload Layer specification defines the data encoding that maps a watermark code to a watermark payload.

A Segment Layer specification defines the semantics used to arrange watermark codes within a watermark segment. A watermark segment is a continuously watermarked interval of a broadcast (which may or may not align with a broadcast segment such as a show, show segment, ad, or promo). The Segment Layer specification can, for example, specify how watermark codes (including the Server Code, Interval Code, and Trigger described earlier) relate to one another within and between watermark segments, including arrangements to ensure correct operation of triggers and interactive applications which are timecode synchronized and/or real-time. A Stream Layer specification defines the application of VP1 watermarks to one or more watermark segments in broadcast streams of various formats. This specifies how the watermark is employed across a range of audio environments, such as various audio channel count, sampling rate, bit resolution, encoding format, alternate audio, enhanced audio, and immersive audio configurations.

In one approach to standardization, an open specification of the emission format of the watermark is standardized but the implementation details of watermark embedders and detectors are left to the discretion of implementers. With this approach, an example embedder and detector implementation details (e.g., source code) can be provided which conforms with the published specifications to help start this process of marketplace improvement. Benefits of this approach include (1) interoperability between all broadcast sources and receivers that conform to the specifications; (2) opportunity for the community of implementers to develop embedder and detector implementations of improving performance over time and (3) opportunity for competition in the market for embedder and detector implementations.

Exemplary Properties of Standardized Watermarks and Associated Devices:

The following sections provide explanations regarding certain exemplary properties of the VP1 watermark and associated devices. The listed properties meet the requirements set forth in the CfP and further provide additional features and functionalities that result in improved watermark embedding and detection, implemented in a cost-efficient manner.

Timing Accuracy:

The VP1 watermark is embedded in sample-accurate alignment with broadcast content. As a matter of convention, the timecode associated with a watermark code embedded over a 1.5 second interval is the timecode corresponding to the first sample of the interval in which the code is embedded. VP1 detectors can determine the time alignment of embedding to within +/−2 milliseconds of accuracy. Under this approach to standardization, the embedders and detectors establish a baseline of functionality that will be available in the marketplace but the timing accuracy of detectors may vary between VP1 watermark detector implementations from competing vendors and can be expected to improve over time.

Data Rate Capacity:

As noted earlier, the VP1 watermark is configured to carry a 50-bit payload over a 1.5 second interval of audio. The underlying technology employed by VP1 supports the use of larger or smaller payloads embedded over longer or shorter time intervals, but the disclosed arrangement provides the best performance that conforms to the requirements of ATSC-3.0. Acquisition time of the VP1 watermark payload is discussed in the following section. After VP1 watermark acquisition in a content stream, the continued presence of the watermark segment can be ascertained with granularity less than a complete payload interval. Under this approach to standardization, the data rate capacity of VP1 can be specified (e.g., in an ATSC standard) and fixed across all conforming broadcasts.

Acquisition Time:

The VP1 watermark payload is fully contained within a 1.5 second interval of content. A VP1 watermark detector which has received an interval of broadcast content containing the full payload has sufficient information to recover all of the "information to convey" as defined in the CfP from a Content, Signaling and Metadata Server.

Device Complexity:

The minimum computational requirements for detection of the VP1 watermark from an uncompressed audio signal are below 10 MIPS, 16 KB code, 3 KB static data, and 24 KB dynamic data. The VP1 detectors perform in this range.

Robustness Against Transcoding:

The VP1 watermark is highly resilient to transcoding and remains detectable with high reliability from signals processed by all commonly used audio encoding formats at bit rates employed for distribution of television content. The VP1 embedders and detectors achieve high reliability even after the embedded audio is subjected to Dolby AC-3 at all supported bit rates and MPEG HE AAC v2 at rates down to 32 kbps stereo across a wide range of content types.

Robustness Against Format Conversion:

The VP1 watermark is highly resilient to format conversion and remains detectable with high reliability from audio format conversions that are employed in the television distribution ecosystems. The VP1 embedders and detectors achieve high reliability when the content is subjected to analog reconversion, sample rate conversion to 12 kHz, down-mixing, 3D spatialization, matrixing and dematrixing, dynamic range compression, and dialog normalization across a wide range of content types.

Robustness Against Compression/Decompression:

For a discussion of the detectability of the VP1 watermark when compression and decompression occur between the watermark embedder and detector see "Robustness against Transcoding," above. With respect to embedding and detection of VP1 watermarks in encoded audio, VP1 baseline design operates successfully with the expectation that watermark processing will occur in uncompressed audio content and the VP1 embedders and detectors operate on uncompressed audio content. This requires decompression of audio before such processing for embedding or detection of watermarks can take place. However, in some implementations, techniques for embedding and/or detection of watermarks in compressed audio can enable embedding or detection of watermarks in compressed domain.

Robustness Against False Detections:

The VP1 watermark incorporates error detection and error correction information which may be used by a detector to achieve any desired rate of false and erroneous detections. The VP1 detectors are configured to achieve a false and erroneous detection rate on individual watermark codes of below one code per 5 years of continuous operation. This rate does not take into account other aspects of watermark client design which will reduce the frequency of occurrence of a user-facing error (e.g. much of the code space is not utilized, the incorrect watermark signal will not continue to be detected in a content stream following a false or erroneous detection, etc.). The term "false detection" in the above context is used to describe the case where a watermark code is reported to be present in unwatermarked content and the term "erroneous detection" to describe the case where an incorrect watermark code is reported to be present in watermarked content.

Extensibility:

As noted in the sections above, the disclosed approach to VP1 standardization involves the establishment of normative specifications for only those design elements necessary to achieve interoperability. This leaves substantial flexibility for evolution in the performance of implementations in the marketplace. As new technologies emerge with capabilities that surpass the limits of the VP1 specification, the industry may find reason to adopt a new or revised specification based on the related or entirely different technologies. Because devices built to the VP1 specification will rely on that the conformance of content with that specification for correct operation, newly produced content from broadcasters that wish to enable interactive services in legacy devices which support the VP1 standard will continue to carry VP1 conforming watermarks.

As noted will be described in below Compatibility sections, VP1 can be co-resident with additional layers of watermarks based on the same underlying technology as VP1 or a different technology. These additional watermarks may carry data that is used in conjunction with VP1 watermark data to extend the functionality of clients that support both VP1 and the new watermark specification. Alternatively, these additional watermarks may carry data that replaces or can otherwise be used independently of the VP1 watermark (e.g. for other applications), in which case new clients may choose to support only the new watermark specification.

Audio Quality:

The VP1 watermark enables audio quality to be maintained at the same level with which broadcast content is otherwise delivered to consumers. VP1 achieves audio quality at least as good as that of AAC at 320 kbps for a 5.1 channel signal under the test conditions of ITU-R BS.1116-1 "Subjective Assessment of Small Audio Impairments."

Compatibility with Watermarks of the Same Technology Erasure/Modification:

VP1 watermarks have the property that a 1.5 second interval of audio can contain only one conforming watermark code. A previously embedded VP1 watermark in content may be modified to carry a new code simply by embedding the new code in that content. A previously embedded VP1 watermark in content may be erased by embedding a designated data sequence, reserved for the purpose of erasure, in that content.

Layering:

The underlying technology employed by VP1 supports the layering of multiple, non-interfering watermarks within the same audio stream. Each watermark layer may have its own characteristics with respect to data payload size and frequency, robustness to distortion, audio quality, and so forth. At the same time, the technical specifications of the watermarks and the technology incorporated in watermark embedders and detectors for the various layers can overlap substantially (e.g. they might differ in as little as a single table of specification parameters).

Compatibility with Watermarks of Other Technology:

Based on the technologies currently employed in the marketplace, there are not expected incompatibilities between the VP1 technology and any other commercially viable watermarking technology, regardless of the order in which the watermarks are applied. Under the disclosed approach to standardization, the compatibility of VP1 watermarks with watermarks of other technologies is expected to be achieved by any VP1 embedder that limits their signal modifications to those which are necessary for embedding or erasing the VP1 watermark.

The watermarks that are embedded in accordance with the disclosed embodiments provide every party in a distribution chain with the technical ability to control downstream interactive functionality. Such a feature enables more use cases, such as allowing rebroadcast of marked content that is taken off-air from another network without triggering the original network's services. Further, while a network can provide default interactive content, some local affiliates can augment the interactive content with individualized services. These features further reduce operating costs; for example, unmarked sources can always be produced from marked sources, creation of "clean" archives can be facilitated, and the likelihood of user-facing handling errors are reduced. These features are aligned with the requirements of some systems that specifically describe erasure of existing marks in a content to allow re-airing off-air clips in new contexts. The alternative (un-erasable watermark) is incompatible with fully open standards (which follows the mantra that security requires secrecy). While providing the capability erasable or replaceable watermarks, the disclosed embodiments allow the particular policy to be relegated to policy makers (and enforcers).

Adaptive Bitrate:

The watermarking system of the disclosed embodiments can tolerate adaptive bitrate compression. For example, the tests conducted on an exemplary embodiment of the disclosed systems show that watermarks can be detected reliably on typical broadcast content down to 32 kbps stereo using HE AAC v2. The use of adaptive bitrate encoding (or adaptive bitrate streaming protocols) is no more damaging to the performance than constant bitrate encoding at comparable rates. It should be noted that the watermarking system of the disclosed embodiments performs comparably when variable bit rate and constant bit rate encoding are employed and, therefore, can be successfully deployed regardless of which bit rate encoding is utilized.

Track Mixing:

In object-based audio, there are different "channels" for different audio objects (e.g., announcer dialog, other language dialog, crowd noise) with the intent that the viewers can mix their audio at the receiver. The watermarking system of the disclosed embodiments is unaffected by personalization, so long as all audio components which may be present in the redistribution content are synchronously embedded with the same Watermark Code. Thus if a viewer selects one track and mutes another (e.g., turn off English announcer, turn on Spanish announcer), such personalization does not affect proper detection of the embedded watermarks. Note that synchronous embedding is not identical to simultaneous embedding; i.e. the watermarks can be embedded at different times or locations, so long as the embedding is synchronized at the Audio Sample level (e.g., the Watermark Symbols and Watermark Codes carry the same data and are time aligned).

Figure 13:
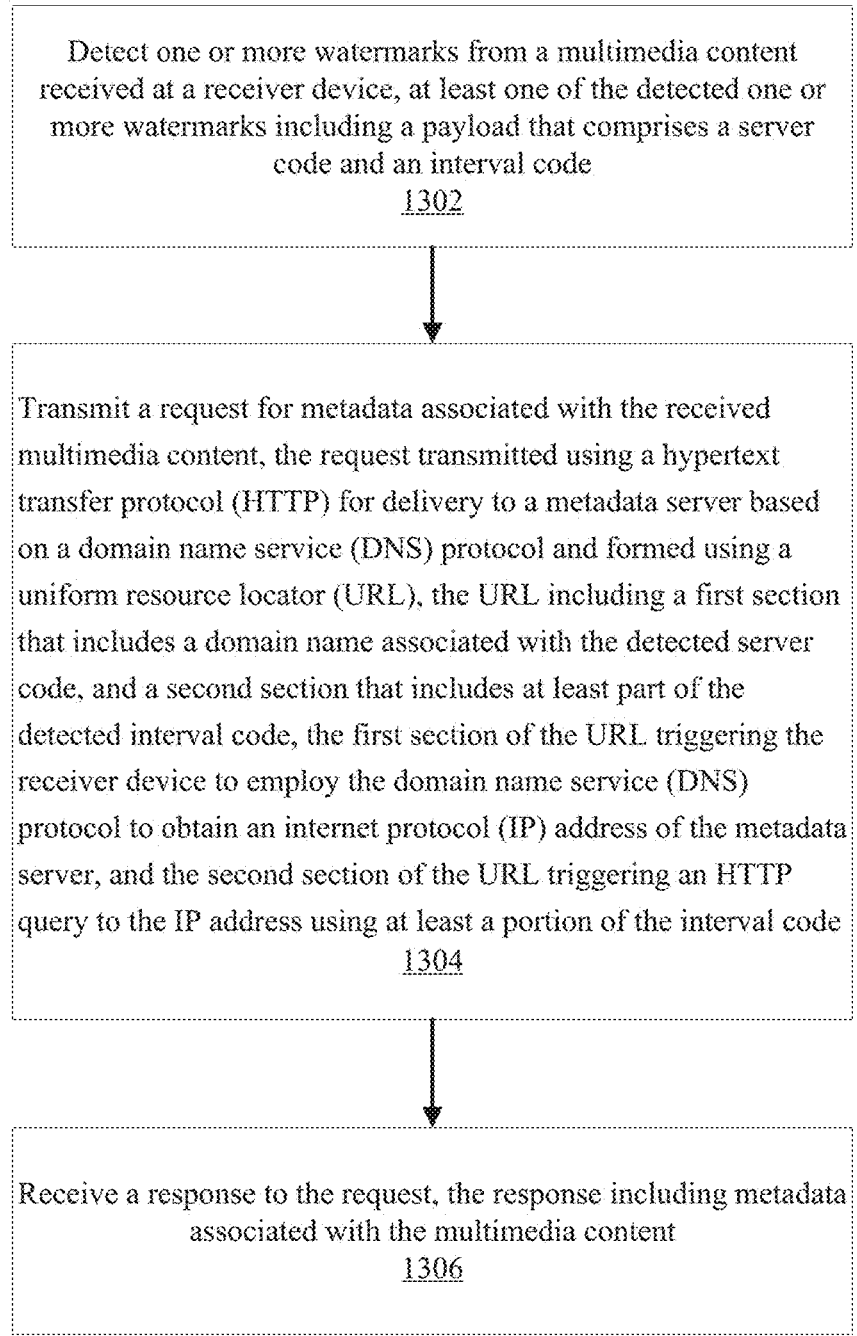
FIG. 13 illustrates a set of operations that can be carried out for obtaining metadata associated with a content in accordance with another exemplary embodiment.
Figure 14:
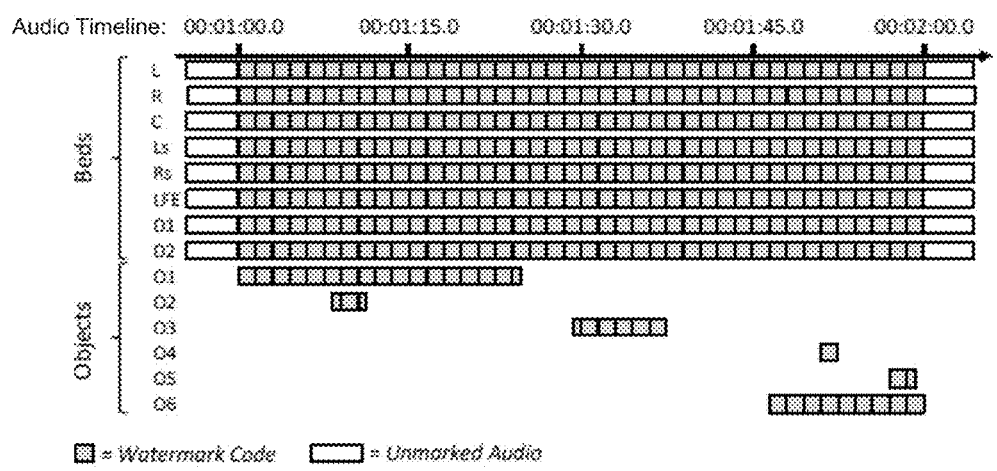
FIG. 14 illustrates a watermark segment structure that is embedded in an audio content according to one exemplary embodiment.

Certain details regarding the Watermark Code were illustrated in FIG. 13, where a hierarchical structure of VP1 watermark with the elements for standardization are identified. FIG. 14 illustrates a watermark segment structure that is embedded in an audio content according to one exemplary embodiment. In the exemplary diagram of FIG. 14, the section identified as "Beds" can correspond to the bed channels in Dolby Atmos audio encoding scheme, and the section identified as "objects" correspond to the audio objects. In the exemplary diagram of FIG. 14, the watermarks are continuously embedded in the broadcast segments where interactive service redistribution support is desired. Synchronous embedding of all broadcast audio elements ensures that watermark can be detected from any mix of rendering of the content.

According to the disclosed embodiments, after acquisition, the watermark segment can be ascertained with granularity less than a complete payload interval. In particular, detection of all (or most) of a watermark code is required for the initial identification of a watermark segment to occur ("acquisition"). Following acquisition, the continued presentation of the watermark segment (e.g., watermark codes with the same Server Code, either constant or incrementing Interval Codes, and Trigger either constant or toggled) can be tracked by the watermark client at the watermark symbol rate (i.e. based on portions of the subsequent watermark codes), enabling the continued presence of the watermark segment in the audio stream to be determined with granularity less than the full watermark code duration.

Acquisition Time:

As note earlier, the VP1 watermark is fully contained within a 1.5 second interval. In a practical content delivery system, there is no maximum acquisition time and in a pathological cases (e.g. severe audio impairment), it may take an arbitrarily long period of time for any watermark code to be detected. In some embodiments, a time-out mechanism is implemented to declare an inability to detect a watermark after a predetermined (e.g., long) period of time has elapsed. Under typical conditions (including low-bit rate distribution), the watermarks that are embedded in accordance with the disclosed techniques can be detected in a short period of time with high reliability. For example, a detection interval can be any one of about 1.5 seconds, 3 seconds, or 6 seconds.

It should also be noted that a specific technology configuration (e.g., "VP1") can be adopted for one standard (e.g., for ATSC standard), providing a single watermark layer which can meet all of the functional requirements set forth in the CfP document that was mentioned earlier. The underlying technology used to create the specific configuration of VP1, however, can simultaneously support multiple technology configurations providing additional layers which interoperate on a non-interfering basis. For instance, if multiple layers of watermarks were essential to meet the requirements of a given approach (e.g., the ATSC's requirements), support for additional layers can be added to the specific VP1 configuration. Alternatively, if it were determined that another set of requirements (e.g., the Society of Motion Picture and Television Engineers' (SMPTE's) watermark requirements) depended on the availability of a watermark layer separate from ATSC, an independent watermark layer based on the same underlying technology (e.g. "VP2") can be specified for use in SMPTE's use cases.

Therefore, multiple watermark layers can be supported. These layers form independent, non-interfering watermark data streams in the same (e.g., audio) content. The layers can be embedded and detected jointly or independently, and the layers can have different performance properties, including in terms of payload size, frequency, throughput, robustness, error rate, audio quality, metadata protocols, etc. The layers can be specified jointly or independently. For example, ATSC and SMPTE could each independently specify their own layer but share a common technology. One particular implementation, such as VP1, can provide one layer for interactive services. Additional layers can also be specified, if necessary, at any time during the initial design/deployment of a particular implementation, or at a future time. The inclusion of additional layers often requires additional complexity, performance, cost, etc. In some embodiments, one watermark layer can serve multiple purposes. For example, the single layer watermarks can be used for service identification, content identification, timecode recovery, interactive services redistribution support, usage measurement, etc. As such, multiple entities with different set of requirements (e.g., SMPTE and ATSC) may be able to fulfill all requirements with a shared layer, which can be established via embedding and metadata workflow analysis.

As noted earlier in connection with, for example, FIG. 7, the Interval Code uniquely identifies the interval of the content, and, in some embodiments, a Server Registrant can be solely responsible for assigning Interval Codes to broadcast content within a registered Code Domain. That is, the Registrar has no administrative or operational involvement in the use of Interval Codes within a validly registered Code Domain. In some embodiments, a watermark segment can be provided that has either a constant Interval Code across its duration or has incrementing Interval Codes across its duration. If the Interval Code is constant, a watermark client can identify the segment, the service, and the applicable interactive services, but it cannot synchronize the interactive services to timecode within the watermark segment. In this case, the Interval Code may just tell the client what broadcast segment, show, ad, promo, or daypart is being presented (e.g., it is associated with an broadcast interval of >1.5 seconds for VP1 watermark). If the Interval Code is incrementing, each Interval Code is unique to a 1.5 second interval of broadcast content and the watermark client is then also able to synchronize precisely (e.g., to within +/−2 ms) to the timecode within the watermark segment.

The disclosed embodiments can further be used when Ad-ID or Entertainment Identifier Registry (EIDR) are used for content identification. The Ad-ID and EIDR standardized universal unique identifiers for advertisement content and movie/television assets, respectively. In particular, the response from the CSM Server to the QUERY request submitted by a receiver can include the AdID and/or EIDR associated with the content carried in the broadcast interval associated with the detected Watermark Code.

Figures 15A, 15B, 15C:
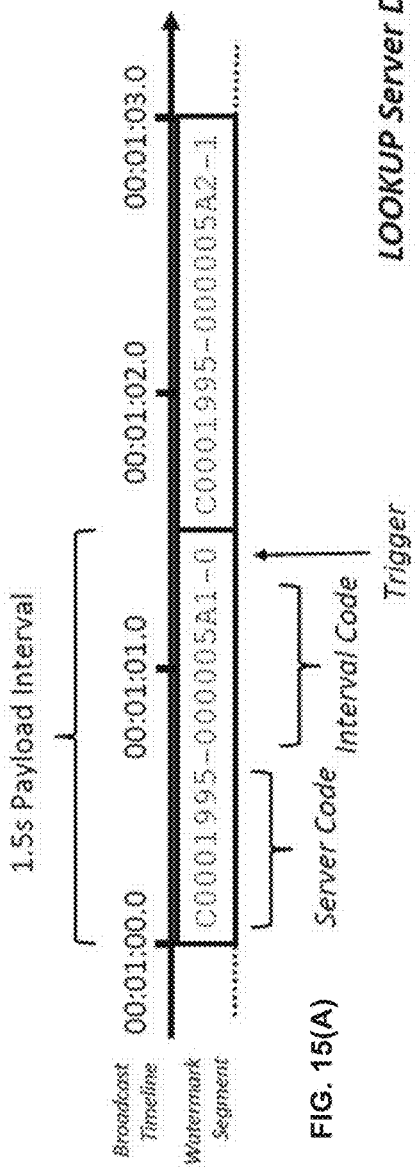
FIG. 15(A) illustrates a watermarked content segment embedded with watermark messages in accordance with an exemplary embodiment.
FIG. 15(B) illustrates an exemplary LOOKUP server data associated with the watermarks of FIG. 15(A)
FIG. 15(C) illustrates an exemplary Query server data associated with the watermarks of FIG. 15(A)

To provide another working example, FIG. 15(A) illustrates a segment of a content with an embedded VP1 watermark in accordance with an exemplary embodiment. The watermarked segment starting timeline (in terms of broadcast time) is at 00:01:00.0, and includes a series of 1.5-second watermarks that include C0001995 embedded Server Code, an incrementing Interval Code and a Trigger bit that is depicted as flipping to a "1" value in the second embedded watermark. The remaining embedded watermarks of the content segment are not shown. FIG. 15(B) shows an exemplary LOOKUP sever data that is associated with the watermarks of FIG. 15(A), illustrating a server IP address of 172.18.20.3. FIG. 15(C) illustrates an exemplary Query Server Data that is associated with the watermarks of FIG. 15(A) that may be obtained from a Query Sever with IP address 172.18.20.3. FIG. 15(C) illustrates a service ID (e.g., XYZ-West), time code(s) (e.g., Jun. 12, 2014 00:01:01.5) and application information for the corresponding Interval Code(s).

FIG. 15(D) shows an example of an EIDR code being provided in a LOOKUP/QUERY response in accordance with an exemplary embodiment. The QUERY/LOOKUP Request and Response correspond to the Interval Code 000005AF, which, in this example, is one of the extracted watermarks from the watermarked content that is depicted in FIG. 15(A) (note that the segment embedded with Interval Code 000005AF is not depicted in FIG. 15(A)). In the context of the disclosed embodiments, the receiver requires a mechanism to identify a Server Lookup Service that it can use to perform a LOOKUP of the address associated with detected Server Codes. In the illustrative example of FIG. 15(D). DNS as the LOOKUP protocol is used and the receiver can identify a DNS server using DHCP, where no pre-population of the receiver is required. In particular, the first section of the Request in FIG. 15(D) utilizes a DNS LOOKUP of the metadata server within a domain that is administered by a trusted authority (e.g., an ATSC-sanctioned registrar). The second part of the Request includes a Query for metadata using HTTP based on the detected Interval Code of 000005AF.

The lower section of FIG. 15(D) shows an exemplary LOOKUP/QUERY Response in XML format that can be provided in response to the Request at the upper section of FIG. 15(D). The Response includes various fields including an XML Version, Encoding (e.g., UTF-8), Query Version, Server Code (the server code value of the watermark payload values that this response is associated with), Interval Code (the server code value of the watermark payload values that this response is associated with), Service ID (the broadcast service which the watermarked content was carried in, such as XYZ-West shown in FIG. 15(C)), Segment EIDR (identifies the program that the content segment containing the watermark is part of as identified using the EIDR industry standard code for program identification), Interval Start Time (the time in the broadcast service timeline at which the watermark payload servercode and/or intervalcode was embedded, thus indicating the starting time of the segment carrying the servercode and/or intervalcode), AIT (Application Information Table; a description of one or more interactive applications which are associated with a time period of the broadcast service), ID (an identifier for an application listed in the AIT, e.g., the Application Information such as 827A753 also shown in FIG. 15(C)), a URL (a URL on the server identified by server code where an application in the AIT resides, e.g., /827A753/interactive.html). Activation Time (the beginning of the time period in the broadcast service timeline during which an application in the AIT is available to run), Deactivation Time (the end of the time period in the broadcast service timeline during which an AIT application's run is deactivated), Next Query Time (the earliest time in the broadcast timeline when the receiver can perform another Query). Next Query Slack (the amount of time, e.g., in seconds, after the nextQueryTime when the receiver may perform another Query), Segment End Time (the time on the broadcast service timeline at which the watermarked segment ends). The broadcast timeline in the description of the above fields is a timeline of the broadcast content and provides a reference timeline for the conveying the timing of various events.

Another aspect of the disclosed embodiments is an architecture that allows multiple servers to be associated with a single Server Code, where each server can support different metadata services. This can be implemented at the system architecture level (e.g. by augmenting the LOOKUP and QUERY protocols) and does not require any change to the watermark itself. As such, more than one CSM can be associated with a single code. For example, an Ad-ID server, a content producer server and a broadcasters server can all associated with one code.

Figure 16:
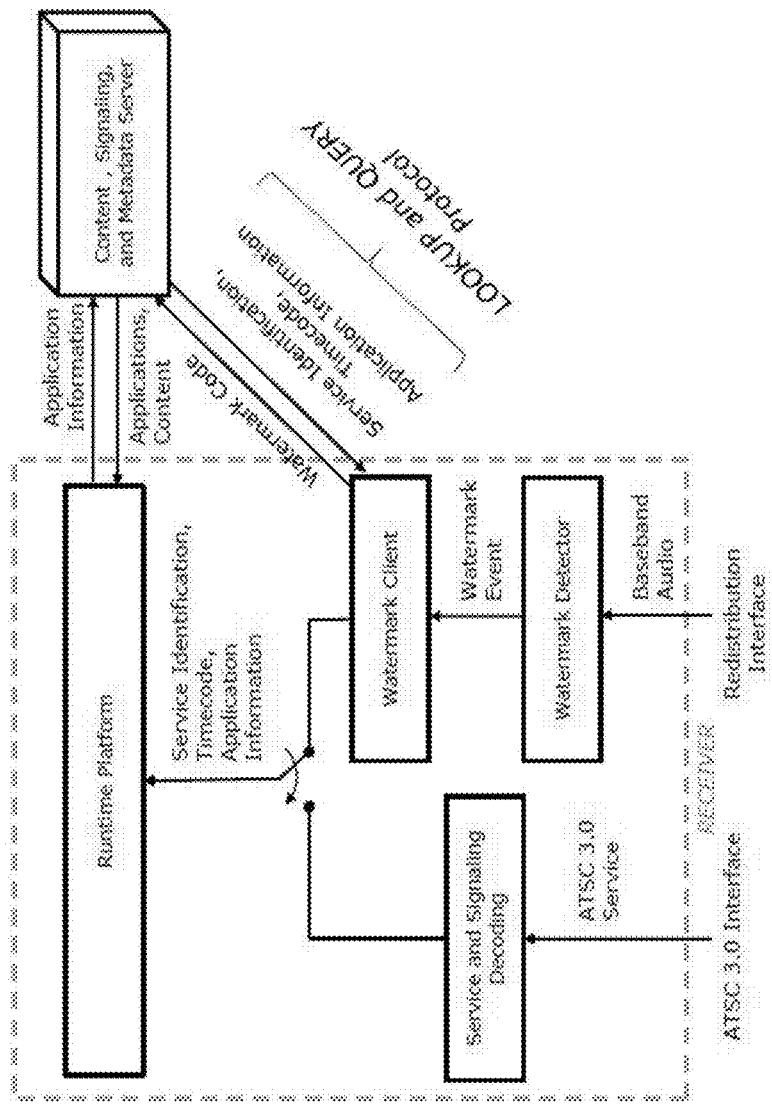
FIG. 16 illustrates a system architecture diagram for incorporating a redistribution interface in accordance with an exemplary embodiment.

FIG. 16 illustrates a system architecture diagram for incorporating a redistribution interface in accordance with an exemplary embodiment. Such system can, for example, enable interactive services over redistribution networks. The embedded content, such as baseband audio as a specific example, is provided through a redistribution interface that is coupled to a watermark detector. Such a redistribution interface is distinguished from the ATSC 3.0 Interface in FIG. 16. In the architecture of FIG. 16, the ATSC 3.0 Interface can receive a broadcast content (e.g., over-the-air), which can already include the associated identification features. In such a case, watermark extraction operations may not be necessary. The ATSC 3.0 Interface is coupled to a service and signaling component, which is coupled to the runtime platform when the depicted switch is in proper alignment (i.e., the switch depicts a particular selection mechanism).

The content received at the Redistribution Interface, however, is likely not to include the associated metadata stream with suitable identification information, and is therefore subject to watermark extraction operations as discussed earlier. One example of the content received at the Redistribution Interface is content provided by a Cable or Satellite Company, which can include broadcast re-runs and original programs. The watermark detector is coupled to a watermark client to provide the extracted watermark codes. Such codes can be part of the information that is transmitted to a content, signaling and metadata (CSM) server. The aforementioned server can also receive application information from a runtime platform and provide applications, content, etc. to the runtime platform. The server can also provide service identification, timecode information, and application information to the watermark client. The operations involving the server can be carried out according to an appropriate LOOKUP and QUERY protocols.

The exemplary architecture of FIG. 16 allows direct and private consumer interaction with broadcasters since receiver manufacturers don't need to engage third party service provider. Using such an architecture, the Registrar can limit the universe of reachable servers such that receivers only access interactive services from registered servers. Further, conditions can be placed on Server Code registration (e.g. FCC license) and registration can be suspended if needed (e.g., if a legitimate server is compromised).

Certain aspects of the disclosed embodiments can be implemented as a device that includes a processor, and a memory comprising processor executable code. The processor executable code, when executed by the processor, configures the device to perform any one of and/or all operations that are described in the present application.

FIG. 9 illustrates a block diagram of a device 900 within which various disclosed embodiments may be implemented. The device of FIG. 9 can be implemented as part of any one of: the Receiver device, the set-top box, the Domain Member, the Domain Registrant or the Domain Registrar that are depicted in FIG. 1. The device 900 comprises at least one processor 904 and/or controller, at least one memory 902 unit that is in communication with the processor 904, and at least one communication unit 906 that enables the exchange of data and information, directly or indirectly, through the communication link 908 with other entities, devices, databases and networks. The communication unit 906 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 900 of FIG. 9 may be integrated as part of any devices or components shown in FIG. 1 to perform any of the disclosed methods.

Figure 10:
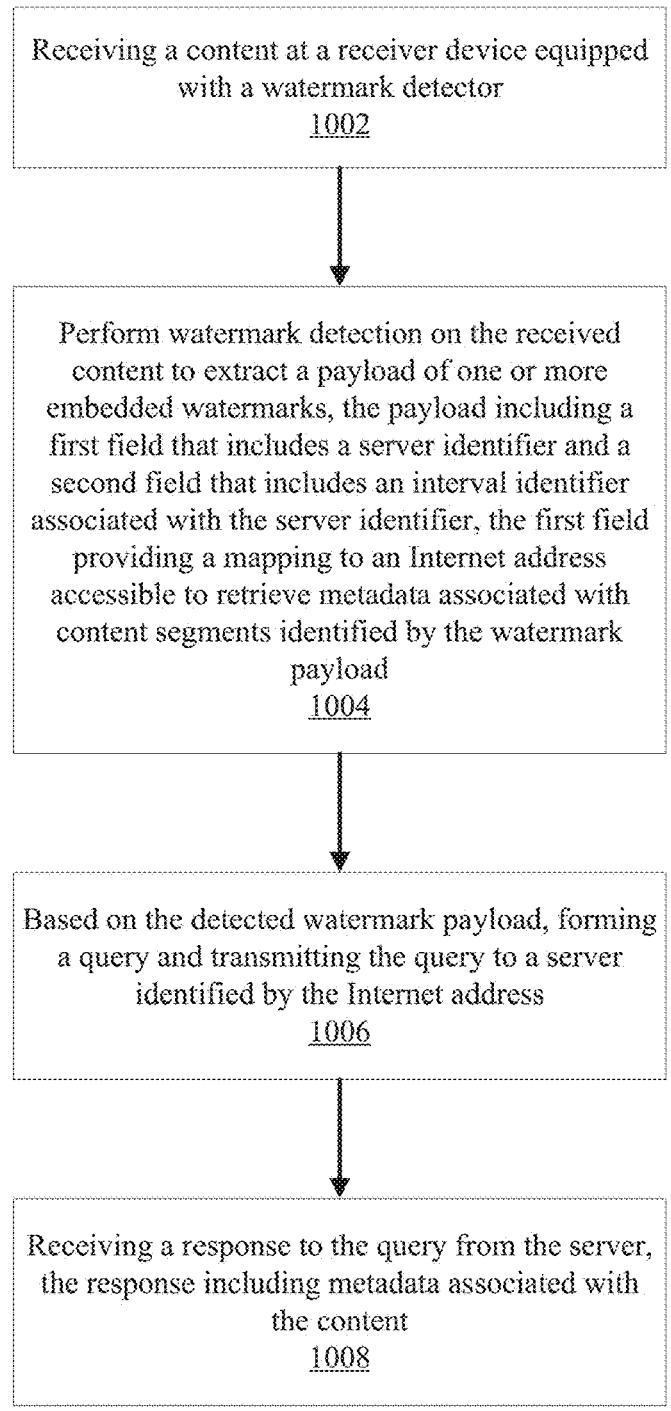
FIG. 10 illustrates a set of operations that can be carried out in accordance with an exemplary embodiment to obtain metadata associated with a multimedia content.
Figure 11:
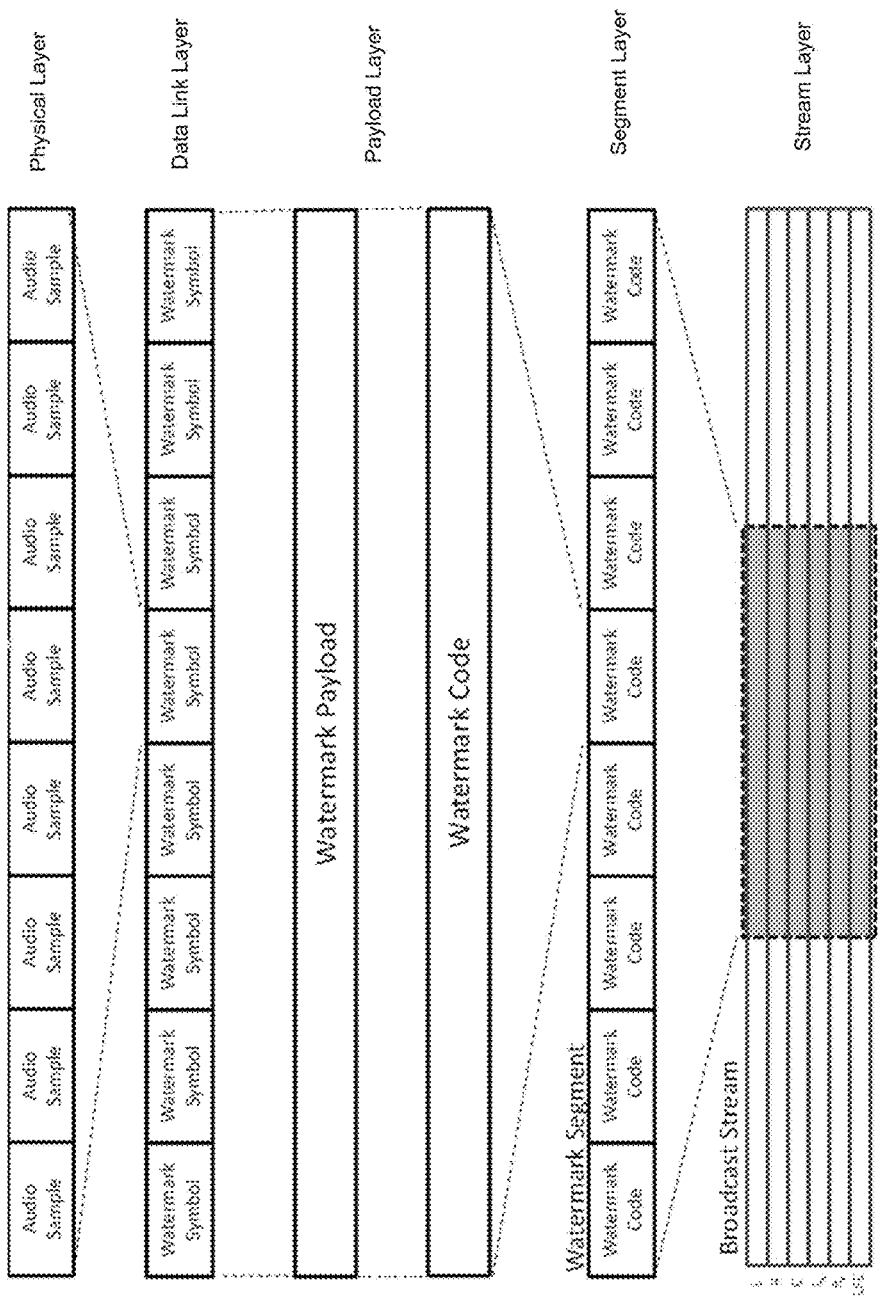
FIG. 11 illustrates a standardized watermark hierarchical structure in accordance with an exemplary embodiment.

FIG. 10 illustrates a set of exemplary operations that may be carried out in accordance with an exemplary embodiment to obtain metadata associated with a multimedia content. At 1002, a content is received at a receiver device equipped with a watermark detector. The received content can, for example, consist of a portion or a components (e.g., an audio or video component) of the multimedia content. At 1004, watermark detection is performed on the received content to extract a payload of one or more embedded watermarks. The payload includes a first field that includes a server identifier and a second field that includes an interval identifier associated with the server identifier. The first field provides a mapping to an Internet address accessible to retrieve metadata associated with content segments identified by the watermark payload. At 1006, a query is formed based on the detected watermark payload, and the query is transmitted to a server identified by the Internet address. At 1008, a response to the query is received from the server. The response includes metadata associated with the content.

Figure 12:
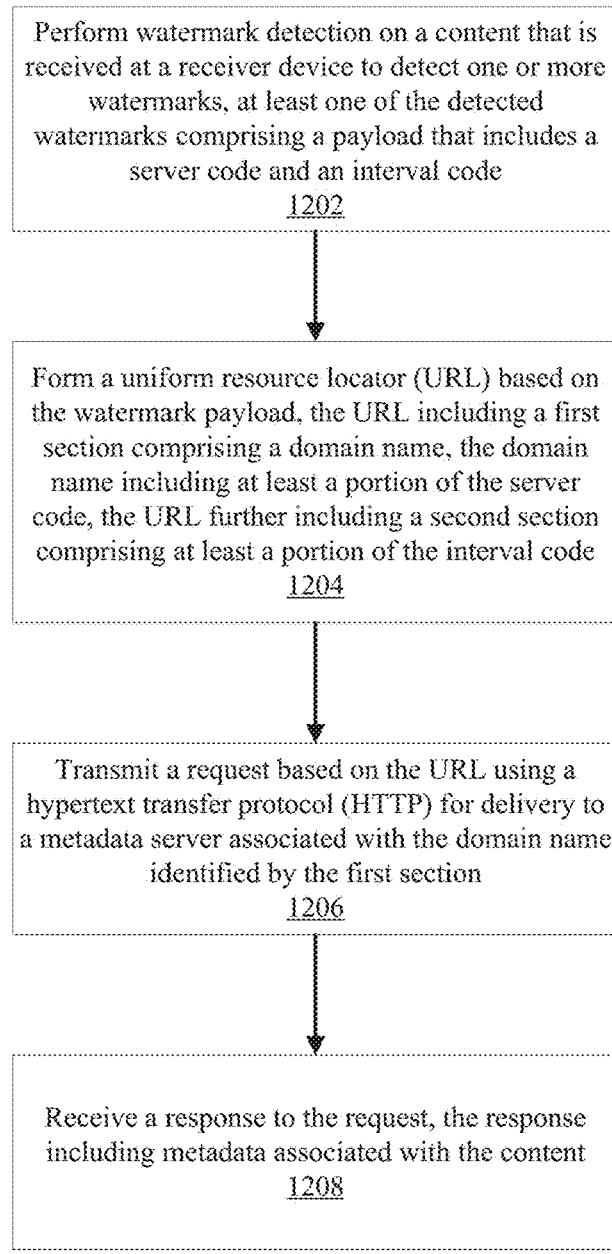
FIG. 12 illustrates a set of operations that can be carried out in accordance with another exemplary embodiment to obtain metadata associated with a content.

FIG. 12 illustrates a set of exemplary operations that may be carried out in accordance with another exemplary embodiment to obtain metadata associated with a multimedia content. At 1202, watermark detection on a content that is received at a receiver device is performed. The watermark detection results in the detection of one or more watermarks, at least one of the detected watermarks comprising a payload that includes a server code and an interval code. At 1204, a uniform resource locator (URL) based on the watermark payload is formed. The URL includes a first section comprising a domain name; the domain name includes at least a portion of the server code. The URL also includes a second section that includes at least a portion of the interval code. At 1206, a request based on the URL using a hypertext transfer protocol (HTTP) is transmitted for delivery to a metadata server associated with the domain name identified by the first section of the URL. At 1208, a response to the query is received. The response includes metadata associated with the content identified by the interval code. Such metadata can, for example, include information for acquisition of an additional content or service associated with the interval of the content identified by the interval code.

In one exemplary embodiment, the request is transmitted to an internet protocol (IP) address which is determined from the domain name of the URL using a domain name service (DNS) protocol. In another exemplary embodiment, at least a portion of the URL is obtained based on information that is stored at a memory cache at the receiver device. In yet another exemplary embodiment, the request is transmitted to an internet protocol (IP) address which is obtained based on: forming a lookup query that includes the server code, transmitting the lookup query to a lookup services server, and receiving the IP address in a lookup response received at the receiver device in response to the lookup query. In one exemplary embodiment, the lookup query is triggered upon a determination that a memory component at the receiver device does not include an association between the server code and the IP address. In another exemplary embodiment, the lookup query is triggered upon a determination that a memory component at the receiver device includes an association between the server code and the IP address that is out-of-date. In still another exemplary embodiment, the lookup query is triggered upon a determination that a memory component at the receiver device includes an association between the server code and a particular IP address, and a further determination that contact with the metadata server using the particular IP address cannot be established. In yet another exemplary embodiment, the lookup services server comprises a DNS cache and the lookup query employs a DNS protocol.

According to one exemplary embodiment, the domain name is formed at least in-part by prepending the server code as a hostname to at least a portion of the domain name, where the at least a portion of the domain name has been established by a server registrar. In another exemplary embodiment, the first section of the URL includes the server code that is prepended as a hostname to a partially qualified domain name, and the second section of the URL includes one or both of the server code or the interval code. In yet another exemplary embodiment, the metadata includes information for acquisition of an additional content or service associated with the content identified by the interval code.

Another aspect of the disclosed technology relates to a device that is capable of receiving a multimedia content. The device includes a processor and a memory including processor executable instructions embodied thereupon. The instructions upon execution, cause the processor to detect one of more watermarks from the received multimedia content. At least one of the detected watermarks includes a payload that includes a server code and an interval code. The instructions upon execution, also cause the processor to form a uniform resource locator (URL) based on the watermark payload. The URL includes a first section comprising a domain name that includes at least a portion of the server code. The URL further comprises a second section that includes at least a portion of the interval code. The device also includes a communication component implemented at least in-part using electronic circuitry to transmit a request based on the URL using a hypertext transfer protocol (HTTP) for delivery to a metadata server associated with the domain name identified by the first section, and to receive a response to the request, the response including metadata associated with the content.

In one exemplary embodiment, the communication component is configured to transmit the request to an internet protocol (IP) address which is determined from the domain name of the URL using a domain name service (DNS) protocol. In another exemplary embodiment, the instructions upon execution, cause the processor to retrieve at least a portion of the URL based on information that is stored at a memory component coupled to the device. In still another embodiment, the instructions upon execution, cause the processor to form a lookup query that includes the server code, and cause the communication component to transmit the lookup query to a lookup services server, receive an IP address in a lookup response, and transmit the request to the received IP address. In one exemplary embodiment, the instructions upon execution, cause the processor to trigger the lookup query upon a determination that a memory component coupled to the device does not include an association between the server code and the IP address. In another exemplary embodiment, the instructions upon execution, cause the processor to trigger the lookup query upon a determination that a memory component coupled to the device includes an association between the server code and the IP address that is out-of-date. In yet another exemplary embodiment, the instructions upon execution, cause the processor to trigger the lookup query upon a determination that a memory component coupled to the device includes an association between the server code and a particular Internet address, and a further determination that contact with the metadata server using the particular Internet address cannot be established. In another exemplary embodiment, the lookup services server comprises a DNS cache and the lookup query employs a DNS protocol.

According to another exemplary embodiment, the instructions upon execution, cause the processor to form the URL at least in-part by prepending the server code as a hostname to at least a portion of the domain name, the at least a portion of the domain name having been established by a server registrar. In one exemplary embodiment, the first section of the URL includes the server code prepended as a hostname to at least a portion of the domain name, and the second section of the URL includes one or both of the server code or the interval code.

Another aspect of the disclosed embodiments relates to a computer program product embodied on one or more non-transitory computer readable media. The computer program product includes program code for performing watermark detection on a content that is received at a receiver device to detect one or more watermarks, where at least one of the detected watermarks includes a payload that includes a server code and an interval code. The computer program product also includes program code for forming a uniform resource locator (URL) based on the watermark payload. The query includes a first section comprising a domain name that includes at least a portion of the server code. The URL further includes a second section that includes at least a portion of the interval code. The computer program product additionally includes program code for transmitting a request based on the URL using a hypertext transfer protocol (HTTP) for delivery to a metadata server associated with the domain name identified by the first section, and program code for receiving a response to the request, the response including metadata associated with the content.

Another aspect of the disclosed embodiments relates to a device that includes a processor, and a memory including processor executable code. The processor executable code when executed by the processor configures the device to perform watermark detection on a content to detect one or more watermarks, where at least one of the detected watermarks comprises a payload that includes a server code and an interval code. The processor executable code when executed by the processor also configures the device to form a uniform resource locator (URL) based on the watermark payload. The URL includes a first section comprising a domain name that includes at least a portion of the server code. The URL further comprises a second section comprising at least a portion of the interval code. The processor executable code when executed by the processor additionally configures the device to transmit a request based on the URL using a hypertext transfer protocol (HTTP) for delivery to a metadata server associated with the domain name identified by the first section, and to receive a response to the request, the response including metadata associated with the content.

FIG. 13 illustrates a set of exemplary operations that may be carried out in accordance with another exemplary embodiment to obtain metadata associated with a multimedia content. At 1302, one or more watermarks are detected from a multimedia content received at a receiver device, where at least one of the detected one or more watermarks includes a payload that comprises a server code and an interval code. At 1204, a request for metadata associated with the received multimedia content is transmitted; the request is transmitted using a hypertext transfer protocol (HTTP) for delivery to a metadata server based on a domain name service (DNS) protocol and formed using a uniform resource locator (URL). The URL includes a first section that includes a domain name associated with the detected server code, and a second section that includes at least part of the detected interval code. The first section of the URL triggers the receiver device to employ the domain name service (DNS) protocol to obtain an internet protocol (IP) address of the metadata server, and the second section of the URL triggers an HTTP query to the IP address using at least a portion of the interval code. At 1306, a response to the request is receive. The response includes metadata associated with the multimedia content.

In one exemplary embodiment, employing the DNS protocol includes communication with one or more of: a DNS cache, a DNS resolver, or a DNS server. In another exemplary embodiment, the IP address is obtained at least in-part by forming a lookup query that includes the server code, transmitting the lookup query to a lookup services server, and receiving the IP address in a lookup response received at the receiver device in response to the lookup query.

Another aspect of the disclosed embodiments relates to a device capable of receiving a multimedia content. The device includes a processor and a memory including processor executable instructions embodied thereupon. The instructions upon execution, cause the processor to detect one of more watermarks from the received multimedia content, wherein at least one of the detected watermarks includes a payload that includes a server code and an interval code. The instructions upon execution, further cause the processor to form a uniform resource locator (URL) based on the watermark payload. The URL includes a first section includes a domain name associated with the detected server code. The URL further comprises a second section that includes at least a portion of the interval code. The device also includes a communication component implemented at least in-part using electronic circuitry to transmit a request for metadata associated with the received multimedia content using a hypertext transfer protocol (HTTP) for delivery to a metadata server based on a domain name service (DNS) protocol and formed using the URL. The he first section of the URL triggers use of the domain name service (DNS) protocol to obtain an internet protocol (IP) address of the metadata server, and the second section of the URL triggers an HTTP query to the IP address using at least a portion of the interval code. The communication component to further receive a response to the request, the response including metadata associated with the content.

In one exemplary embodiment, the communication component is configured to communicate with one or more of: a DNS cache, a DNS resolver, or a DNS server. In another exemplary embodiment, the instructions upon execution, cause the processor to form a lookup query that includes the server code, and cause the communication component to transmit the lookup query to a lookup services server, and receive the IP address in a lookup response.

One aspect of the disclosed embodiments relates to a system that includes a domain lookup server and a registrant server. The domain lookup server is configured to receive a lookup request from a receiver, where the request comprises a server code obtained from watermarks extracted from a multimedia content. The domain lookup server can receive a server name associated with the server code from a registrar server, and to further provide a response for transmission to the receiver. The domain lookup server's response includes the server name. The system's registrant server includes or is in communication with a metadata server that is populated with at least metadata associated with the multimedia content, and a processor implemented using electronic circuitry to receive, from the registrar server, the server code assigned to the registrant server, to assign one or more interval codes corresponding to one or more segments of the multimedia content, and to communicate information comprising each assigned interval code and associated metadata to the metadata server.

In one exemplary embodiment, the above system further includes a watermark inserter coupled to the registrant server. The watermark inserter is configured to receive the sever code, and the one or more interval codes the multimedia content, and to embed the server code and the one or more interval codes as watermarks into the multimedia content. In another exemplary embodiment, the system also is in communication with a content broadcaster that is coupled to the watermark inserter. The content broadcaster can receive the embedded multimedia content and can transmit the embedded multimedia content to the receiver. In some implementations, the system also includes the receiver, and a set-top-box (STB) coupled to the receiver. The STB is configured to receive the embedded multimedia content from the content broadcaster and to provide at least one component of the received embedded multimedia content to the receiver. In some exemplary implementations, the at least one component is an audio component of the multimedia content.

According to one exemplary embodiment, the above system further includes one or more additional content registrant servers, where each of the one or more additional registrant servers is coupled to the registrar server and to the metadata server. Each registrant server includes a corresponding processor implemented using electronic circuitry to receive, from the registrar server, a unique server code assigned to the corresponding registrant server. Further, each registrant server can assign one or more interval codes associated with the registrant server's unique server code and corresponding to one or more segments of the multimedia content. Each registrant server can further communicate information comprising the registrant server's assigned interval code(s) and associated metadata to the metadata server. In one exemplary implementation, the watermark inserter is coupled to at least one of the additional registrant servers to receive the server code and interval codes corresponding to the at least one of the additional registrant servers, and to embed the server code and interval codes corresponding to the at least one of the additional registrant servers as watermarks into the multimedia content.

In another exemplary embodiment, the watermark inserter is configured to insert the server code and interval codes corresponding to the at least one of the additional registrant servers as a different watermark layers into the multimedia content than the server code and interval codes of another registrant server. In yet another exemplary embodiment, the receiver is configured to detect the embedded watermarks from at least two watermarking layers to obtain at least two unique server codes, and to further transmit one or both of the unique server codes to the lookup server, and, in response, to receive, from the domain lookup server, server names associated with one or both of the unique server codes.

One aspect of the disclosed technology relates to a method for obtaining associated information for a multimedia content. The method includes receiving a content at a receiver device equipped with a watermark detector and performing watermark detection on the received content to extract a payload of one or more embedded watermarks. The payload includes a first field that includes a server identifier and a second field that includes an interval identifier associated with the server identifier. The first field provides a mapping to an Internet address accessible to retrieve metadata associated with content segments identified by the watermark payload. The method further includes, based on the detected watermark payload, forming a query and transmitting the query to a server identified by the Internet address, and receiving a response to the query from the server, the response including metadata associated with the content.

In one exemplary embodiment, the value of the first field is assigned by a central authority to domain registrants, and each domain registrant controls an assignment and usage of the second field. In another exemplary embodiment, a correspondence between the first field and the Internet addresses is pre-established at least in-part by a registrar server. In yet another exemplary embodiment, the mapping is stored in the receiver device in a memory. In another exemplary embodiment, the receiver device receives the mapping or the Internet address in response to a lookup request including the first field to a lookup server. In one exemplary embodiment, the query is a standardized query that is used to obtain the metadata corresponding to a particular value of the interval identifier. In still another exemplary embodiment, the payload includes a third field that is indicative of availability of the metadata associated with a content interval that is identified by the interval identifier. In yet another exemplary embodiment, the query is formed and transmitted to the server upon detection of a change in a value of the third field.

According to one exemplary embodiment, the payload is further structured to include a payload type field that identifies the payload as corresponding to one of a small domain, a medium domain or a large domain. In one particular embodiment, the payload is 50 bits long and the payload type field is a 2-bit field. In another particular embodiment, the payload that corresponds to a small domain includes a 30-bit first field, a 17-bit second, and a 1-bit interactive bit, the payload that corresponds to the medium domain includes a 22-bit first field, a 25-bit second field, and a 1-bit interactive bit, and the payload that corresponds to the large domain includes an 18-bit first field, a 29-bit second field, and a 1-bit interactive bit. In one exemplary embodiment, the interactive bit provides an indication as to whether or not an interactive content is available.

According to another embodiment, the first field specifies a server code, the second field specifies an interval code that is associated with a specific interval of the content, and each server code is assigned by a central authority to one of a content producer, a content distributor, or a service provider. In yet another embodiment, the metadata includes instructions that allows the receiver device to execute particular interactive services associated with a content interval that is identified by the interval identifier. In one particular embodiment, the metadata identifies one or more of the following: an Internet address of an interactive services server, or one or more parameters that indicate when and how an interactive service can be configured.

Another aspect of the disclosed embodiments relates to a device capable of receiving a multimedia content. The device includes a watermark detector implemented at least in-part using electronic circuitry to detect one or more watermarks from the received multimedia content. The detected watermarks include a payload that comprises a first field that includes a server identifier and a second field that includes an interval identifier associated with the server identifier. The first field provides a mapping to an Internet address accessible to retrieve metadata associated with content segments identified by the watermark payload. The device further includes a processor and a memory including processor executable instructions embodied thereupon. The instructions, upon execution, cause the processor to form a query. The device also includes a communication component implemented at least in-part using electronic circuitry to transmit the query to a server identified by the Internet address, and to receive a response to the query from the server. The response includes metadata associated with the content.

In one exemplary embodiment, value of the first field is assigned by a central authority to domain registrants, and each domain registrant controls an assignment and usage of the second field. In another exemplary embodiment, a correspondence between the first field and the Internet addresses is pre-established at least in-part by a registrar server. In still another embodiment, the mapping is stored in the receiver device and is accessible for use by the receiver device for retrieving the Internet address based on the first field. In yet another embodiment, the communication component is configured to transmit a lookup request including the first field to a lookup server and to receive the mapping or the Internet address in response to the lookup request.

According to another exemplary embodiment, the instructions executed by the processor form a lookup query based on a value of the first field, and the communication component is configured to transmit the lookup request to a lookup server and to receive the Internet address. In this particular embodiment, the instructions executed by the processor further form the query as a standardized query based on the Internet address and a particular value of the interval identifier, and the communication component further is configured to transmit the standardized query to a server and to receive the metadata corresponding to the particular value of the interval identifier. In one exemplary embodiment, the instructions executed by the processor form the query upon detection of a change in a value of the third field.

In another exemplary embodiment associated with the above device, the payload includes a third field that is indicative of availability of the metadata associated with a content interval that is identified by the interval identifier. In still another embodiment, the payload is further structured to include a payload type field that identifies the payload as corresponding to one of a small domain, a medium domain or a large domain. In one specific implementation, the payload is 50 bits long and the payload type field is a 2-bit field. In another specific implementation, the payload corresponding to a small domain includes a 30-bit first field, a 17-bit second, and a 1-bit interactive bit, the payload corresponding to the medium domain includes a 22-bit first field, a 25-bit second field, and a 1-bit interactive bit, and the payload corresponding to the large domain includes an 18-bit first field, a 29-bit second field, and a 1-bit interactive bit. In still another embodiment, the interactive bit provides an indication as to whether or not an interactive content is available.

According to one exemplary embodiment associated with the above device, the first field specifies a server code, the second field specifies an interval code that is associated with a specific interval of the content, and each server code is assigned by a central authority to one of a content producer, a content distributor, or a service provider. In yet another embodiment, the instructions executed by the processor causes the processor to use the metadata to execute particular interactive services associated with a content interval that is identified by the interval identifier. In another exemplary embodiment, the metadata identifies one or more of the following: an Internet address of an interactive services server, or one or more parameters that indicate when and how an interactive service can be configured.

Another aspect of the disclosed technology relates to a computer program product embodied on one or more non-transitory computer readable media. The computer program product includes program code for receiving a content at a receiver device equipped with a watermark detector, and program code for performing watermark detection on the received content to extract a payload of one or more embedded watermarks. The payload includes a first field that includes a server identifier and a second field that includes an interval identifier associated with the server identifier. The first field provides a mapping to an Internet address accessible to retrieve metadata associated with content segments identified by the watermark payload. The computer program product further includes program code for, based on the detected watermark payload, forming a query and transmitting the query to a server identified by the Internet address, and program code for, receiving a response to the query from the server, the response including metadata associated with the content.

Another aspect of the disclosed technology relates to a device that includes a processor, and a memory including processer executable code. The processor executable code when executed by the processor configures the device to extract one or more watermarks that are embedded in a multimedia content, where the extracted watermarks include a payload that comprises a first field that includes a server identifier and a second field that includes an interval identifier associated with the server identifier. The first field provides a mapping to an Internet address accessible to retrieve metadata associated with content segments identified by the watermark payload. The processor executable code when executed by the processor further configures the device to form a query, transmit the query to a server identified by the Internet address, and receive a response to the query from the server, the response including metadata associated with the content.

In another aspect of the disclosed embodiments, a method for obtaining metadata associated with a multimedia content is provided. The method includes performing watermark detection on a content that is received at a receiver device to detect one or more watermarks. At least one of the detected watermarks comprises a payload that includes a server code and an interval code. The method also includes forming a uniform resource locator (URL) based on the watermark payload. The URL includes a first section comprising a domain name that includes at least a portion of the server code. The URL further includes a second section comprising at least a portion of the interval code. The method further includes transmitting a request based on the URL using a hypertext transfer protocol (HTTP) for delivery to a metadata server associated with the domain name identified by the first section, and receiving a response to the request, the response including metadata associated with the content.

In one exemplary embodiment, the request is transmitted to an internet protocol (IP) address which is determined from the domain name of the URL using a domain name service (DNS) protocol. In another exemplary embodiment, at least a portion of the URL is obtained based on information that is stored at a memory cache at the receiver device. In yet another exemplary embodiment, the request is transmitted to an internet protocol (IP) address which is obtained based on: forming a lookup query that includes the server code, transmitting the lookup query to a lookup services server, and receiving the IP address in a lookup response received at the receiver device in response to the lookup query. In one exemplary embodiment, the lookup query is triggered upon a determination that a memory component at the receiver device does not include an association between the server code and the IP address. In another exemplary embodiment, the lookup query is triggered upon a determination that a memory component at the receiver device includes an association between the server code and the IP address that is out-of-date. In still another exemplary embodiment, the lookup query is triggered upon a determination that a memory component at the receiver device includes an association between the server code and a particular IP address, and a further determination that contact with the metadata server using the particular IP address cannot be established. In yet another exemplary embodiment, the lookup services server comprises a DNS cache and the lookup query employs a DNS protocol.

According to one exemplary embodiment, the domain name is formed at least in-part by prepending the server code as a hostname to at least a portion of the domain name, where the at least a portion of the domain name has been established by a server registrar. In another exemplary embodiment, the first section of the URL includes the server code that is prepended as a hostname to a partially qualified domain name, and the second section of the URL includes one or both of the server code or the interval code. In yet another exemplary embodiment, the metadata includes information for acquisition of an additional content or service associated with the content identified by the interval code.

Another aspect of the disclosed technology relates to a device that is capable of receiving a multimedia content. The device includes a processor and a memory including processor executable instructions embodied thereupon. The instructions upon execution, cause the processor to detect one of more watermarks from the received multimedia content. At least one of the detected watermarks includes a payload that includes a server code and an interval code. The instructions upon execution, also cause the processor to form a uniform resource locator (URL) based on the watermark payload. The URL includes a first section comprising a domain name that includes at least a portion of the server code. The URL further comprises a second section that includes at least a portion of the interval code. The device also includes a communication component implemented at least in-part using electronic circuitry to transmit a request based on the URL using a hypertext transfer protocol (HTTP) for delivery to a metadata server associated with the domain name identified by the first section, and to receive a response to the request, the response including metadata associated with the content.

In one exemplary embodiment, the communication component is configured to transmit the request to an internet protocol (IP) address which is determined from the domain name of the URL using a domain name service (DNS) protocol. In another exemplary embodiment, the instructions upon execution, cause the processor to retrieve at least a portion of the URL based on information that is stored at a memory component coupled to the device. In still another embodiment, the instructions upon execution, cause the processor to form a lookup query that includes the server code, and cause the communication component to transmit the lookup query to a lookup services server, receive an IP address in a lookup response, and transmit the request to the received IP address. In one exemplary embodiment, the instructions upon execution, cause the processor to trigger the lookup query upon a determination that a memory component coupled to the device does not include an association between the server code and the IP address. In another exemplary embodiment, the instructions upon execution, cause the processor to trigger the lookup query upon a determination that a memory component coupled to the device includes an association between the server code and the IP address that is out-of-date. In yet another exemplary embodiment, the instructions upon execution, cause the processor to trigger the lookup query upon a determination that a memory component coupled to the device includes an association between the server code and a particular Internet address, and a further determination that contact with the metadata server using the particular Internet address cannot be established. In another exemplary embodiment, the lookup services server comprises a DNS cache and the lookup query employs a DNS protocol.

According to another exemplary embodiment, the instructions upon execution, cause the processor to form the URL at least in-part by prepending the server code as a hostname to at least a portion of the domain name, the at least a portion of the domain name having been established by a server registrar. In one exemplary embodiment, the first section of the URL includes the server code prepended as a hostname to at least a portion of the domain name, and the second section of the URL includes one or both of the server code or the interval code.

Another aspect of the disclosed embodiments relates to a computer program product embodied on one or more non-transitory computer readable media. The computer program product includes program code for performing watermark detection on a content that is received at a receiver device to detect one or more watermarks, where at least one of the detected watermarks includes a payload that includes a server code and an interval code. The computer program product also includes program code for forming a uniform resource locator (URL) based on the watermark payload. The query includes a first section comprising a domain name that includes at least a portion of the server code. The URL further includes a second section that includes at least a portion of the interval code. The computer program product additionally includes program code for transmitting a request based on the URL using a hypertext transfer protocol (HTTP) for delivery to a metadata server associated with the domain name identified by the first section, and program code for receiving a response to the request, the response including metadata associated with the content.

Another aspect of the disclosed embodiments relates to a device that includes a processor, and a memory including processor executable code. The processor executable code when executed by the processor configures the device to perform watermark detection on a content to detect one or more watermarks, where at least one of the detected watermarks comprises a payload that includes a server code and an interval code. The processor executable code when executed by the processor also configures the device to form a uniform resource locator (URL) based on the watermark payload. The URL includes a first section comprising a domain name that includes at least a portion of the server code. The URL further comprises a second section comprising at least a portion of the interval code. The processor executable code when executed by the processor additionally configures the device to transmit a request based on the URL using a hypertext transfer protocol (HTTP) for delivery to a metadata server associated with the domain name identified by the first section, and to receive a response to the request, the response including metadata associated with the content.

Another aspect of the disclosed embodiments relates to a method for facilitating acquisition of metadata associated with a content. The method detecting one or more watermarks from a multimedia content received at a receiver device. At least one of the detected one or more watermarks includes a payload that comprises a server code and an interval code. The method also includes transmitting a request for metadata associated with the received multimedia content. The request is transmitted using a hypertext transfer protocol (HTTP) for delivery to a metadata server based on a domain name service (DNS) protocol and formed using a uniform resource locator (URL). The URL includes a first section that includes a domain name associated with the detected server code, and a second section that includes at least part of the detected interval code. The first section of the URL triggers the receiver device to employ the domain name service (DNS) protocol to obtain an internet protocol (IP) address of the metadata server, and the second section of the URL triggers an HTTP query to the IP address using at least a portion of the interval code. The method additionally includes receiving a response to the request, where the response includes metadata associated with the multimedia content.

In one exemplary embodiment, employing the DNS protocol includes communication with one or more of: a DNS cache, a DNS resolver, or a DNS server. In another exemplary embodiment, the IP address is obtained at least in-part by forming a lookup query that includes the server code, transmitting the lookup query to a lookup services server, and receiving the IP address in a lookup response received at the receiver device in response to the lookup query.

Another aspect of the disclosed embodiments relates to a device capable of receiving a multimedia content. The device includes a processor and a memory including processor executable instructions embodied thereupon. The instructions upon execution, cause the processor to detect one of more watermarks from the received multimedia content, wherein at least one of the detected watermarks includes a payload that includes a server code and an interval code. The instructions upon execution, further cause the processor to form a uniform resource locator (URL) based on the watermark payload. The URL includes a first section includes a domain name associated with the detected server code. The URL further comprises a second section that includes at least a portion of the interval code. The device also includes a communication component implemented at least in-part using electronic circuitry to transmit a request for metadata associated with the received multimedia content using a hypertext transfer protocol (HTTP) for delivery to a metadata server based on a domain name service (DNS) protocol and formed using the URL. The he first section of the URL triggers use of the domain name service (DNS) protocol to obtain an internet protocol (IP) address of the metadata server, and the second section of the URL triggers an HTTP query to the IP address using at least a portion of the interval code. The communication component to further receive a response to the request, the response including metadata associated with the content.

In one exemplary embodiment, the communication component is configured to communicate with one or more of: a DNS cache, a DNS resolver, or a DNS server. In another exemplary embodiment, the instructions upon execution, cause the processor to form a lookup query that includes the server code, and cause the communication component to transmit the lookup query to a lookup services server, and receive the IP address in a lookup response.

Figure 17:
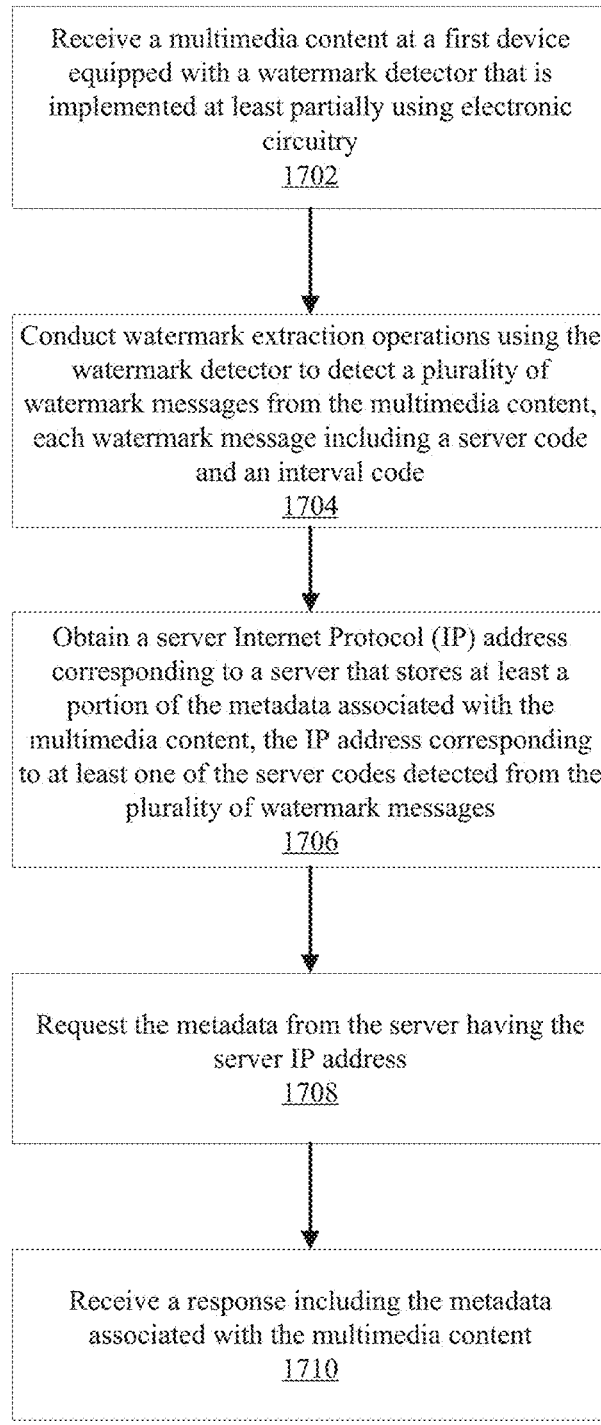
FIG. 17 illustrates a set of operations that can be carried out for obtaining metadata associated with a content in accordance with another exemplary embodiment.

FIG. 17 illustrates a set of exemplary operations that may be carried out in accordance with another exemplary embodiment to obtain metadata associated with a multimedia content. Such a multimedia content can be, for example, an audio or a video content. At 1702, a multimedia content is received at a first device equipped with a watermark detector that is implemented at least partially using electronic circuitry. At 1704, watermark extraction operations are conducted using the watermark detector to detect a plurality of watermark messages from the multimedia content, where each watermark message includes a server code and an interval code. At 1706, a server Internet Protocol (IP) address is obtained that corresponds to a server that stores at least a portion of the metadata associated with the multimedia content, the IP address corresponding to at least one of the server codes that is detected from the plurality of watermark messages. At 1708, the metadata from the server having the server IP address, and, at 1710, a response is received that includes the metadata associated with the multimedia content.

Figure 18:
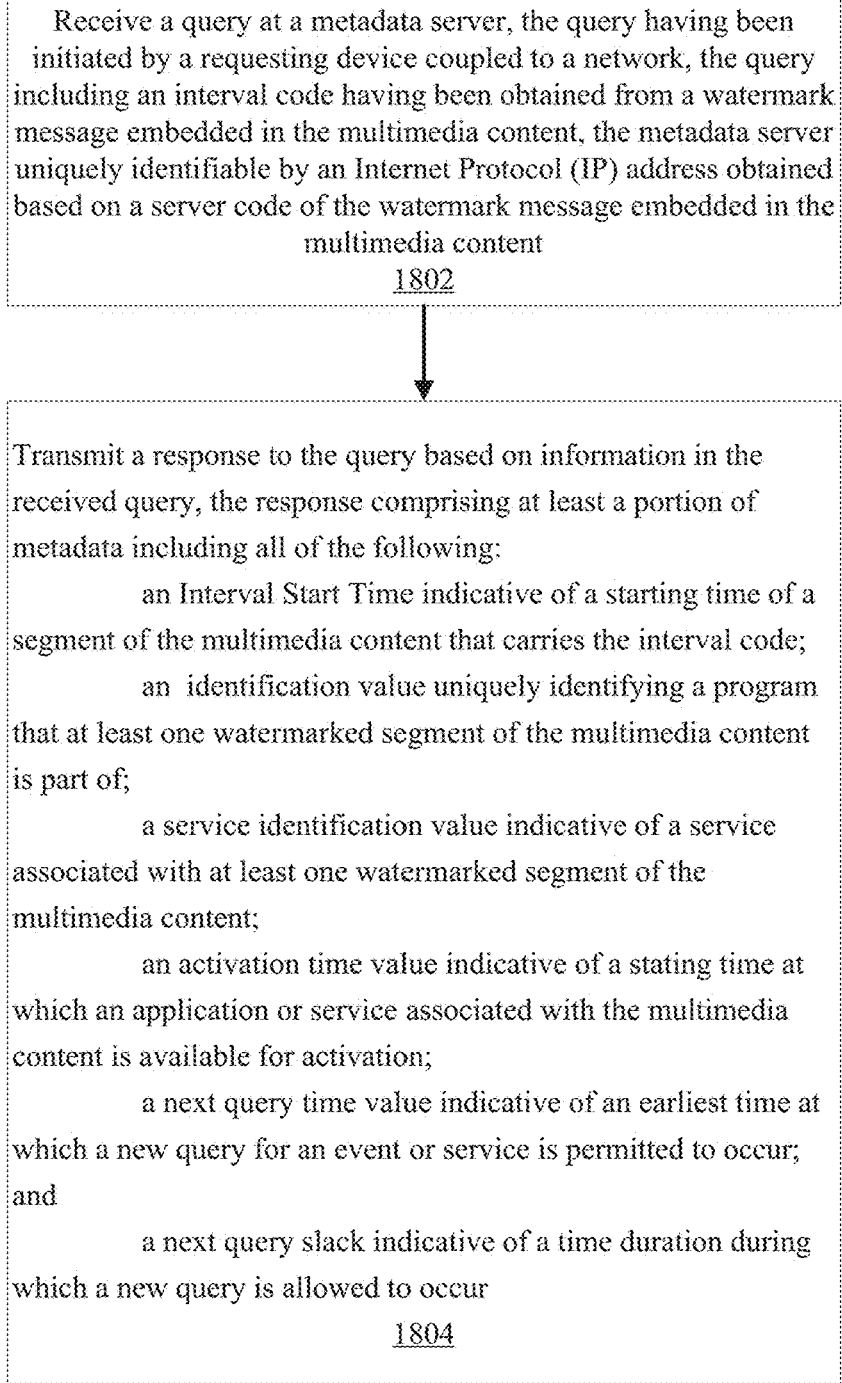
FIG. 18 illustrates a set of operations that can be carried out for providing metadata associated with a content in accordance with another exemplary embodiment.

FIG. 18 illustrates a set of exemplary operations that may be carried out in accordance with an exemplary embodiment to provide metadata associated with a multimedia content. The operations in FIG. 18 can be carried out at, for example, a CSM server. At 1802, a query is received at a metadata server, the query having been initiated by a requesting device coupled to a network. The query includes an interval code having been obtained from a watermark message embedded in the multimedia content, where the metadata server is uniquely identifiable by an Internet Protocol (IP) address obtained based on a server code of the watermark message embedded in the multimedia content. At 1804, a response to the query is transmitted based on information in the received query. The response comprises at least a portion of metadata including all of the following: an Interval Start Time indicative of a starting time of a segment of the multimedia content that carries the interval code; an identification value uniquely identifying a program that at least one watermarked segment of the multimedia content is part of; a service identification value indicative of a service associated with at least one watermarked segment of the multimedia content; an activation time value indicative of a stating time at which an application or service associated with the multimedia content is available for activation; a next query time value indicative of an earliest time at which a new query for an event or service is permitted to occur, and a next query slack indicative of a time duration during which a new query is allowed to occur.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

What is claimed is:

1. A method for providing metadata associated with a multimedia content, comprising:

receiving a query at a metadata server, the query having been initiated by a requesting device coupled to a network, the query including an interval code having been obtained from a watermark message embedded in the multimedia content, the interval code identifying a specific interval of the multimedia content, the metadata server identifiable by an Internet Protocol (IP) address obtained based on a server code of the watermark message embedded in the multimedia content; and transmitting a response to the query based on information in the received query including the server code and the interval code, the response comprising at least a portion of metadata including an Interval Start Time indicative of a starting time of a particular segment of the multimedia content that carries the interval code and at least one of the following:

a service identification value indicative of a service associated with at least one watermarked segment of the multimedia content;

an activation time value indicative of a starting time at which an application or service associated with the multimedia content is available for activation;

a next query time value indicative of an earliest time at which a new query for an event or service is permitted to occur; or a next query slack indicative of a time duration during which a new query is allowed to occur.

2. The method of claim 1, further comprising, in response to the query, providing an interactive content to the requesting device that is based on the received interval code.

3. The method of claim 1, further comprising receiving at least a portion of the metadata from an additional server that is associated with a server registrant device or a content provider device, and storing the at least a portion of the metadata at the metadata server.

4. The method of claim 3, further comprising receiving an interactive content from the additional server that is associated with the content provider device and storing the received interactive content at the metadata server.

5. The method of claim 1, wherein the response further comprises an identification value uniquely identifying a program that at least one watermarked segment of the multimedia content is part of.

6. A server device, comprising:
at least one processor;
a non-transitory data storage device configured to store one or more of metadata or interactive multimedia content; and
a memory, comprising processor executable code, the processor executable code when executed by one of the at least one processor configures to server device to:
receive a query at a metadata server, the query having been initiated by a requesting device coupled to a network, the query including an interval code having been obtained from a watermark message embedded in the multimedia content, the metadata server identifiable by an Internet Protocol (IP) address obtained based on a server code of the watermark message embedded in the multimedia content; and
transmit a response to the query based on information in the received query including the server code and the interval code, the response comprising at least a portion of metadata including an Interval Start Time indicative of a starting time of a particular segment of the multimedia content that carries the interval code and at least one of the following:
a service identification value indicative of a service associated with at least one watermarked segment of the multimedia content;
an activation time value indicative of a starting time at which an application or service associated with the multimedia content is available for activation;

a next query time value indicative of an earliest time at which a new query for an event or service is permitted to occur; or a next query slack indicative of a time duration during which a new query is allowed to occur.

7. The server device of claim 6, the processor executable code when executed by the at least one processor further configures to server device to, in response to the query, provide an interactive content to the requesting device that is based on the received interval code.

8. The server device of claim 6, wherein the processor executable code when executed by the at least one processor further configures to server device to receive at least a portion of the metadata from an additional server that is associated with a server registrant device or a content provider device, and store the at least a portion of the metadata at the metadata server.

9. The server device of claim 8, wherein the processor executable code when executed by the at least one processor further configures to server device to receive an interactive content from the additional server that is associated with the content provider device and store the received interactive content at the metadata server.

10. A computer program product, embodied on one or more non-transitory computer readable media, comprising:
program code for receiving a query at a metadata server, the query having been initiated by a requesting device coupled to a network, the query including an interval code having been obtained from a watermark message embedded in the multimedia content, the metadata server identifiable by an Internet Protocol (IP) address obtained based on a server code of the watermark message embedded in the multimedia content; and
program code for transmitting a response to the query based on information in the received query including the server code and the interval code, the response comprising at least a portion of metadata including an Interval Start Time indicative of a starting time of a particular segment of the multimedia content that carries the interval code and at least one of the following:
a service identification value indicative of a service associated with at least one watermarked segment of the multimedia content;
an activation time value indicative of a starting time at which an application or service associated with the multimedia content is available for activation;
a next query time value indicative of an earliest time at which a new query for an event or service is permitted to occur; or
a next query slack indicative of a time duration during which a new query is allowed to occur.

* * * * *